(12) United States Patent
Mosteller

(10) Patent No.: US 10,963,768 B2
(45) Date of Patent: Mar. 30, 2021

(54) ILLUMINABLE CARD

(71) Applicant: CPI CARD GROUP-COLORADO, INC., Littleton, CO (US)

(72) Inventor: Barry Roy Mosteller, Castle Pines, CO (US)

(73) Assignee: CPI CARD GROUP—COLORADO, INC., Littleton, CO (US)

(*) Notice: Subject to any disclaimer, the term of this patent is extended or adjusted under 35 U.S.C. 154(b) by 0 days.

(21) Appl. No.: 16/770,892

(22) PCT Filed: Dec. 11, 2018

(86) PCT No.: PCT/US2018/065015
§ 371 (c)(1),
(2) Date: Jun. 8, 2020

(87) PCT Pub. No.: WO2019/118505
PCT Pub. Date: Jun. 20, 2019

(65) Prior Publication Data
US 2021/0056371 A1 Feb. 25, 2021

Related U.S. Application Data

(60) Provisional application No. 62/597,762, filed on Dec. 12, 2017.

(51) Int. Cl.
*G06K 19/077* (2006.01)
*B32B 15/08* (2006.01)
(Continued)

(52) U.S. Cl.
CPC ........ *G06K 19/07705* (2013.01); *B32B 15/08* (2013.01); *G06K 19/06028* (2013.01);
(Continued)

(58) Field of Classification Search
None
See application file for complete search history.

(56) References Cited

U.S. PATENT DOCUMENTS

| 6,070,990 A * | 6/2000 | Dalton | F21L 4/027 |
| | | | 235/487 |
| 2008/0156885 A1* | 7/2008 | Landau | G06K 19/0702 |
| | | | 235/492 |

(Continued)

FOREIGN PATENT DOCUMENTS

DE    102013102003 A1    8/2014

OTHER PUBLICATIONS

International Search Report and Written Opinion issued in PCT/US2018/065015 dated Mar. 7, 2019 (11 pages).

(Continued)

*Primary Examiner* — Kristy A Haupt
(74) *Attorney, Agent, or Firm* — Dorsey & Whitney LLP

(57) ABSTRACT

An improved illuminable card includes a carrier layer, first and second contact pads, or rails, supportably interconnected to the carrier layer to receive a power signal, and an illuminable patch supportably interconnected to the carrier layer or another carrier layer for electrical coupling with the first and second contact pads and illumination upon receipt of a power signal at the first and second contact pads. The illuminable card may include a mask overlying at least a portion of the illuminable patch and having a predetermined pattern to define a predetermined image visible on a side of the illuminable card upon illumination of the illuminable patch.

30 Claims, 10 Drawing Sheets

(51) Int. Cl.
  *G09F 13/00*    (2006.01)
  *H01Q 1/22*     (2006.01)
  *H01Q 7/00*     (2006.01)
  *G06K 19/06*    (2006.01)
  *B42D 25/20*    (2014.01)
  *B42D 25/23*    (2014.01)

(52) U.S. Cl.
  CPC ....... *G06K 19/06037* (2013.01); *G09F 13/00* (2013.01); *H01Q 1/2283* (2013.01); *H01Q 7/00* (2013.01); *B32B 2307/20* (2013.01); *B32B 2307/412* (2013.01); *B32B 2307/422* (2013.01); *B32B 2425/00* (2013.01); *B42D 25/23* (2014.10); *B42D 25/285* (2014.10)

(56)              References Cited

U.S. PATENT DOCUMENTS

| 2013/0320080 | A1  | 12/2013 | Olson et al. |
| 2014/0023838 | A1* | 1/2014  | Egli ............ B42D 25/29 428/204 |
| 2015/0069132 | A1  | 3/2015  | Pueschner et al. |
| 2015/0269477 | A1  | 9/2015  | Finn et al. |
| 2016/0132761 | A1  | 5/2016  | Hanmer |
| 2017/0246899 | A1  | 8/2017  | Cok et al. |

OTHER PUBLICATIONS

Extended European Search Report issued in European Patent Application No. 18888491.0 dated Dec. 21, 2020 (8 pages).

\* cited by examiner

ILLUMINABLE CARD

CROSS REFERENCE TO RELATED APPLICATIONS

This application is a national stage application under 35 U.S.C. § 371 of International Application No. PCT/US2018/065015 filed Dec. 11, 2018, entitled "IMPROVED ILLUMINABLE CARD", which claims the priority benefit of U.S. Provisional Patent Application No. 62/597,762 filed Dec. 12, 2017, entitled "ILLUMINABLE CARDS", the contents of each of which are hereby is incorporated herein by reference in its their entirety.

BACKGROUND

Single panel cards, and in particular cards sized for ready stowage in and retrieval from a wallet or purse, are employed for a wide variety of purposes. For example, such cards may take the form of collector cards, access cards, identity cards, loyalty cards, membership cards, transit cards and transaction cards (e.g. credit, debit and gift cards). Such cards are often associated with a given financial institution and/or merchant of goods and/or services who issues or otherwise promotes the distribution/use of such cards. In turn, such cards often comprise visual and/or functional features unique to or otherwise associable with a corresponding merchant and/or financial institution, thereby enhancing consumer brand recognition and goodwill in relation to the merchant and/or financial institution.

In an effort to distinguish one card from another, cards of the described nature have incorporated increasingly creative features. However, such features often entail significant additional card production expense, thereby curtailing widespread implementation. For example, implementation of such features may entail a degree of customization that is simply too expensive for limited or even widespread card distributions by smaller or otherwise cost-conscience financial institutions and merchants. And, incorporation of such creative features often accomplishes only a single one of two competing objectives, i.e. visible card differentiation or functional card differentiation.

SUMMARY

The present disclosure encompasses embodiments of improved cards and production methodologies that facilitate the implementation of creative visual/functional illumination features by providing both card customization and card production efficiencies.

In one embodiment, an illuminable card may include a card body comprising an electrically non-conductive carrier layer, and an at least partially light transmissive (e.g. transparent or translucent) first core layer overlying and interconnected to the carrier layer. Further, the illuminable card may include electrically-conductive first and second contact pads, supportably interconnected to the carrier layer in opposing, spaced relation to one another, for receiving a power signal from one of an external power supply (i.e. a contactless and/or contact power supply not included in the illuminable card) and an on-board power supply (e.g. a battery or the like), and an illuminable patch supportably interconnected to the carrier layer for electrical coupling (e.g. direct or capacitive coupling) with the first and second contact pads, e.g. between the first and second contact pads, for illumination through the first core layer on a first side of the illuminable card upon receipt of a power signal at the first and second contact pads.

Such illumination may be provided for aesthetic and/or for functional purposes. For example, the illumination may provide a visual indication associated with an intended functional use of the illuminable card and/or may provide or otherwise highlight a desired visual image.

For such purposes, the illuminable card may further include a mask overlying a portion of the illuminable patch and defining a predetermined image visible on a first side of the illuminable card upon illumination of the illuminable patch. The mask may be patterned to block and permit passage of predetermined portions of light emitted by the illuminable patch to define the predetermined image.

As may be appreciated, the provision of an illuminable patch and overlying mask to define a predetermined image provides numerous advantages relative to design approaches that rely strictly upon customized configuration of illumination sources to obtain the desired image. For example, in disclosed illuminable card embodiments, a base card design may be established so that customization may be readily and inexpensively realized via the utilization of a mask that provides the desired visible image upon illumination of the illuminable patch. By way of example, the predetermined visible image may correspond with a name, logo, character, graphics or other visual representation associated with or otherwise selected by a given entity.

Further, in contemplated embodiments, the first and second contact pads may be defined by elongated, first and second contact rails, respectively. In turn, the utilization of first and second contact rails facilitates ready positioning of the illuminable patch at a plurality of different positions relative thereto during card production, thereby further facilitating card customization while advantageously accommodating use of a base card design to yield production efficiencies. In that regard, opposing edge portions of said first and second contact rails may have corresponding lengths in a first dimension that are each greater than a maximum cross-dimension of the illuminable patch in said first dimension. Additionally or alternatively, opposing edge portions of the first and second contact rails may have corresponding lengths in a first dimension that are each greater than lengths of adjacent, corresponding edge portions of the illuminable patch in the first dimension, thereby facilitating positioning of the illuminable patch at a plurality of different positions relative thereto.

Further, opposing edge portions of the first and second contact rails may extend coincidentally and/or in equispaced relation along the corresponding lengths thereof. For example, opposing edge portions of the first and second contact rails may extend in substantially parallel relation along the corresponding lengths thereof.

In one approach, a rectangular card body may be provided, wherein the opposing edge portions of the first and second contact rails extend in parallel relation to a peripheral edge of the card body. For example, the opposing edge portions of the first and second contact rails may extend parallel to a length edge or a width edge of the illuminable card, thereby accommodating illuminable patch positioning at a plurality of different locations along the length or the width of the illuminable card.

In some implementations, the first and second contact rails may each have a corresponding substantially constant width along the corresponding lengths thereof. In one approach, the first and second contact rails may have the same width along the corresponding lengths thereof. Further, the first and second contact rails may have substantially equal corresponding lengths.

In some embodiments, a first part of the edge portion of the first contact rail may be overlapped by a corresponding edge portion of the illuminable patch (i.e. in direct, overlapping contact therewith), and a second part of the first contact rail may extend beyond the corresponding edge portion of the illuminable patch in a first dimension (e.g. extending beyond either or both ends of the corresponding edge portion of the illuminable patch). In such implementations, the non-overlapped, second part of the edge portion of the first contact rail may have a corresponding length in a first dimension that is at least 50%, or even at least 200%, of a length of the overlapped, first part of the edge portion of the first contact rail in the first dimension.

In some embodiments, the mask may comprise a printed mask, e.g. printed on an inward-facing side and/or outward facing side of the first core layer. The printed mask may comprise at least one or a plurality of printed ink layers, wherein the printed ink is at least partially opaque or substantially opaque so as to block passage of predetermined portions of light emitted by the illuminable patch to yield the predetermined image.

In one approach, the printed mask may define at least a first portion of a first print layer printed on the first core layer. In turn, a second portion of the first print layer may comprise one or more of:
  printed visible human-readable characters;
  printed visible graphics;
  a printed visible machine-readable marking; and,
  a printed flood layer extending across substantially all of an inward-facing side or outward-facing side of the first core layer.

In another approach, the mask may be defined by removing portions a layer that is at least partially opaque or substantially opaque so as to permit passage of predetermined portions of light emitted by the illuminable patch to yield the predetermined image. For example, a metal foil layer with removed portions may be provided between the illuminable patch and the first core layer.

In some implementations, the first portion and the second portion of the first print layer may be printed as part of a continuous printing operation to further facilitate production efficiencies. Optionally, a second print layer may be printed on a side of the first core layer that opposes the side on which the first print layer is printed, wherein the second print layer comprises one or more of:
  printed visible human-readable characters;
  printed visible graphics;
  a printed visible machine-readable marking; and,
  a printed flood layer extending across substantially all of an inward-facing side or outward-facing side of the first core layer.

In some arrangements, the illuminable patch may comprise an electrically conductive matrix (e.g. defined by a plurality of electrically conductive particles) and a plurality of illuminable diodes disposed between the first and second contact pads, or rails, wherein the illuminable diodes illuminate when a power signal is received at the first and second contact pads. In one approach, the diodes may be disposed on the downward-facing side of the carrier layer with at least a portion of the electrically conductive matrix disposed over the diodes, wherein a portion of the electrically conductive matrix may overlap and thereby directly contact a portion of the first contact pad, or rail, and wherein the electrically conductive matrix may be slightly spaced from or in direct contact with the second contact pad, or rail. In such arrangements, the carrier layer may be transparent to allow light emitted by illuminable patch to pass therethrough.

Optionally, a phosphorescent patch may be provided in overlapping relation to the illuminable patch so as to fluoresce upon illumination of the illuminable patch, e.g. between the illuminable patch and the mask. The phosphorescent patch may have substantially the same configuration as the configuration of the illuminable patch. In one approach, the phosphorescent patch may be supportably interconnected to the upward-facing side of the carrier layer in opposing relation to the illuminable patch. In another approach, the phosphorescent patch may be supportably interconnected to the downward-facing side of the carrier layer, with the illuminable patch supportably disposed thereupon (e.g. a plurality of diodes may be supportably disposed over the phosphorescent patch with an electrically conductive matrix supportably disposed over the diodes).

In some embodiments, the illuminable card may comprise an optional translucent layer that is located in overlapping relation to the illuminable patch, between the illuminable patch and the overlying mask, and that includes at least a portion that extends to a peripheral edge of the illuminable card. In turn, a portion of light emitted by the illuminable patch may be internally reflected within the translucent layer and directed to the peripheral edge of the illuminable card to illuminate such peripheral edge, thereby providing a distinctive feature to the illuminable card. In one approach, the translucent layer may comprise a sheet-like layer that extends to and about the entirety of the peripheral edge of the illuminable card. For example, when a rectangular illuminable card is provided, each of the length edges and width edges may be illuminated by the translucent layer upon illumination of the illuminable patch. Optionally, the translucent layer may comprise a fluorescent pigment, or dye.

In contemplated embodiments, the card body may further include a second core layer interconnected to the carrier layer on a side opposite to the first core layer, and/or a metal layer (e.g. a metal foil layer) interconnected to the carrier layer on a side opposite to the first core layer. In conjunction with such embodiments, the first core layer, and the second core layer and/or metal layer may be of a common peripheral configuration so that each layer extends continuously around a peripheral edge of the illuminable card.

Various approaches may be implemented to provide for the receipt of a power signal from an external power supply. In one approach, the illuminable card may comprise a first antenna, electrically coupled or couplable at offset locations thereof (e.g. at or near opposite ends thereof) to different ones of the first and second contact pads, or rails, for receiving a contactless signal from an external source of radio-frequency electromagnetic radiation to thereby provide a power signal at the first and second contact pads. In some embodiments, the first antenna may be supportably interconnected to the carrier layer. In some implementations, the first antenna may be supportably interconnected to the downward-facing side of the carrier layer, wherein the first antenna may extend about the first and second contact pads, or rails, and the illuminable patch. In other implementations, the first antenna may be supportably interconnected to the upward-facing side of the carrier layer, opposite to the downward-facing side of the carrier layer, wherein the first antenna may extend in non-overlapping relation to and about the first and second contact pads, or rails, and the illuminable patch, and wherein the first antenna is electrically coupled or couplable to the first and second contact pads via an electrically conductive bridge that extends through the carrier layer.

In some arrangements, a film layer(s) may be interconnected to either or both sides of the carrier layer in overlapping relation the components supportably interconnected to the carrier layer (e.g. first and second contact pads, illuminable patch, optional first antenna, optional phosphorescent patch, optional second antenna referenced below, etc.) to define a pre-laminated inlay. For example, transparent film layers may be adhesively attached to and cover the entirety of each side of the carrier layer and supported components, thereby providing a pre-laminated inlay to facilitate assembly and interconnection (e.g. via lamination) with additional layers of the illuminable card (e.g. second core layer, metal layer, outer protective layers, adhesive and/or thermoset interconnecting layers, etc.).

In some implementations, the illuminable card may include an integrated circuit (IC) chip disposed in a pocket that extends into the illuminable card on the first side thereof, and a second antenna electrically coupled or couplable to the IC chip for receiving a contactless signal from an external contactless chip card reader that includes a source of radio-frequency electromagnetic radiation, wherein the contactless signal is received by the first antenna and the second antenna to provide a power signal at the first and second contact pads and a combined power/data signal to the IC chip, respectively. In the later regard, IC chip and contactless chip card reader may be provided for contactless data transmissions therebetween. In contemplated arrangements, the second antenna may be supportably interconnected to the carrier member (e.g. supportably interconnected to the same side or the opposite side to which the first antenna and/or first and second contact pads, or rails, are supportably interconnected).

In some embodiments, the first antenna may comprise a first plurality of metallic loops and the second antenna may comprise a second plurality of metallic loops, wherein the second plurality of metallic loops extend about the first plurality of metallic loops, e.g. on the same side or an opposite side of the carrier layer. Further, the first plurality of metallic loops and second plurality of metallic loops may be provided to extend about the first and second contact pads and the illuminable patch on the same side or an opposite side of the carrier layer.

Alternatively, in some embodiments, the illuminable card may include an integrated circuit (IC) chip disposed in a pocket that extends into the illuminable card on the first side thereof, wherein the first antenna is electrically coupled or couplable to the IC chip for receiving a contactless signal from an external contactless chip card reader that includes a source of radio-frequency electromagnetic radiation. In turn, the contactless signal is received by the first antenna to provide a power signal at the first and second contact pads and a combined power/data signal to the IC chip. In the later regard, IC chip and contactless chip card reader may be provided for contactless data transmissions therebetween.

In another approach for utilizing an external power supply, the illuminable card may comprise an IC chip electrically interconnected to a plurality of contact pads disposed for receiving a contact electrical power/data signal from an external contact chip card reader, wherein the IC chip and contact chip card reader may be provided for contact data transmissions therebetween. In conjunction with such approach, the first and second contact pads, or rails, may be electrically interconnected to different ones of the plurality of contact pads and/or corresponding contact terminals of the integrated circuit chip for receiving a power signal to illuminate the illuminable patch. In one approach, the IC chip and plurality of contact pads may be disposed in a pocket that extends in to the illuminable card from the first side thereof. In turn, metallic, first and second connection lines may be supportably disposed on the carrier layer and interconnected to and between the first and second contact pads, or rails, and different ones of the plurality of contact pads and/or corresponding contact terminals of the integrated circuit chip, respectively.

The first core layer, second core layer, and protective, outer film layers may comprise a polymer-based material (e.g. polyvinyl chloride, polyethylene terephthalate, polyethylene terephthalate glycol-modified, polyester, and/or polycarbonate). Further, the carrier layer may comprise a polymer-based material (e.g. polyethylene terephthalate and/or polycarbonate). Additionally, the various layers described herein may be interconnected via lamination, with thermo-adhesive polymer-based layers and/or thermosetting, polymer-based layers disposed between adjacent one of the layers.

In modified embodiments incorporating one or more of the foregoing features, an illuminable card may include a card body comprising interconnected, electrically non-conductive first and second carrier layers, and a first core layer overlying and interconnected to the second carrier layer. Electrically-conductive first and second contact pads may be supportably interconnected to an upward-facing side of the first carrier layer for receiving a power signal from one of an external power supply (i.e. a contactless and/or contact power supply not included in the illuminable card) and an on-board power supply (e.g. a battery or the like). Further, an illuminable patch may be supportably interconnected to a downward-facing side of the second carrier layer, facing the first carrier layer, for electrical coupling with the first contact pad and second contact pad, wherein the illuminable patch illuminates upon receipt of a power signal at the first and second contact pads. Such illumination may be provided through the first core layer on a first side of the illuminable card and/or at a peripheral edge of the illuminable card.

In contemplated implementations, the second carrier layer may be transparent or translucent. In the later regard, at least a portion of light emitted by the illuminable patch may be internally reflected in a translucent second carrier layer and directed to a peripheral edge of the illuminable card to illuminate the peripheral edge.

In some embodiments, the illuminable patch may be of an elongate configuration and located to extend along at least a portion or an entirety of a peripheral edge of the illuminable card. For example, the illuminable patch may extend along and in parallel relation to one peripheral side edge, a plurality of peripheral side edges (e.g. opposing and/or contiguous side edges), or the entire peripheral edge of a rectangular illuminable card. In one approach, the illuminable patch may extend along an entirety of a peripheral edge of the illuminable card to define a frame-like configuration (e.g. a rectangular frame). In such embodiments, the illuminable patch may define an open field on the second carrier for overlapped positioning relative to one or more antennas provided on the first carrier layer, as otherwise described herein. Further, a phosphorescent patch may be provided in overlapping relation to the illuminable patch, and may have a configuration that is substantially the same as the configuration of the illuminable patch (e.g. a frame-like configuration).

In some implementations, the first and second contact pads may be defined by elongated, first and second contact rails, respectively. In turn, the illuminable patch may be configured for positioning between and electrical coupling with the first and second contact rails at a plurality of different positions relative thereto (e.g. the illuminable patch may be a polygonal, ellipsoid or other closed configuration and located within a central field of the second carrier in spaced relation to a peripheral edge thereof). Such positioning may be defined during card production, thereby facilitating card customization while advantageously accommodating use of a base card design to yield production efficiencies. Additionally or alternatively, opposing edge portions of the first and second contact rails may have corresponding lengths in a first dimension that are each greater than a maximum cross-dimension of the illuminable patch in the first dimension. Further, the opposing edge portions may have lengths great than adjacent, corresponding edge portions of the illuminable patch in the first dimension, thereby facilitating positioning of the illuminable patch at a plurality of different positions relative thereto.

Additionally, opposing edge portions of the first and second contact rails may extend coincidentally and/or in equispaced relation along the corresponding lengths thereof. For example, opposing edge portions of the first and second contact rails may extend in substantially parallel relation along the corresponding lengths thereof.

In one approach, a rectangular card body may be provided, wherein the opposing edge portions of the first and second contact rails extend in parallel relation to a peripheral edge of the card body. For example, the opposing edge portions of the first and second contact rails may extend parallel to a length edge or a width edge of the illuminable card, thereby accommodating illuminable patch positioning at a plurality of different locations along the length or the width of the illuminable card.

In some implementations, the first and second contact rails may each have a corresponding substantially constant width along the corresponding lengths thereof. In one approach, the first and second contact rails may have the same width along the corresponding lengths thereof. Further, the first and second contact rails may have substantially equal corresponding lengths.

In some embodiments, a first part of the edge portion of the first contact rail may be overlapped by a corresponding edge portion of the illuminable patch (i.e. in direct, overlapping contact therewith), and a second part of the first contact rail may extend beyond the corresponding edge portion of the illuminable patch in a first dimension (e.g. extending beyond either or both ends of the corresponding edge portion of the illuminable patch). In such implementations, the non-overlapped, second part of the edge portion of the first contact rail may have a corresponding length in a first dimension that is at least 50%, or even at least 200%, of a length of the overlapped, first part of the edge portion of the first contact rail in the first dimension.

In contemplated embodiments, the illuminable card may comprise a first antenna for electrical coupling at offset locations thereof (e.g. at or near opposite ends thereof) to different ones of the first and second contact pads, or rails, for receiving a contactless signal from an external source of radio-frequency electromagnetic radiation to thereby provide a power signal at the first and second contact pads. In some implementations, the first antenna may be supportably interconnected to the upward-facing side of the first carrier layer, wherein the first antenna may be located to extend about the first and second contact pads, or rails. The first antenna may be also located to extend about an illuminable patch that is positioned between the first and second contact pads, or rails, for electrical coupling therewith.

Alternatively, or additionally, the first antenna may be located to extend within and in non-overlapping relation to an elongated illuminable patch that extends along one or a plurality of side edges of a rectangular illuminable card. For example, the first antenna may be located within an open field defined by a frame-like illuminable patch, as otherwise described herein. In such arrangements, first and second electrical contacts may be supportably disposed on the downward-facing side of the second carrier layer in electrical contact with and between different, offset portions of the elongated illuminable patch and different ones of the first and second contact pads, wherein electrically non-conductive material may be provided between the first and second electrical contacts and the first antenna in over-lapped regions thereof.

In some embodiments, the illuminable card may include a mask overlying a portion of an illuminable patch positioned and defining a predetermined image visible on a first side of the illuminable card upon illumination of the illuminable patch. The mask may be patterned to block and permit passage of predetermined portions of light emitted by the illuminable patch to define the predetermined image.

In some embodiments, the mask may comprise a printed mask, e.g. printed on an inward-facing side and/or outward facing side of the first core layer. The printed mask may comprise at least one or a plurality of printed ink layers, wherein the printed ink is at least partially opaque or substantially opaque so as to block passage of predetermined portions of light emitted by the illuminable patch to yield the predetermined image.

In one approach, the printed mask may define at least a first portion of a first print layer printed on the first core layer. In turn, a second portion of the first print layer may comprise one or more of:
  printed visible human-readable characters;
  printed visible graphics;
  a printed visible machine-readable marking; and,
  a printed flood layer extending across substantially all of
    an inward-facing side or outward-facing side of the first
    core layer.

In some implementations, the first portion and the second portion of the first print layer may be printed as part of a continuous printing operation to further facilitate production efficiencies. Optionally, a second print layer may be printed on a side of the first core layer that opposes the side on which the first print layer is printed, wherein the second print layer comprises one or more of:
  printed visible human-readable characters;
  printed visible graphics;
  a printed visible machine-readable marking; and,
  a printed flood layer extending across substantially all of
  an inward-facing side or outward-facing side of the first core
  layer.

In another approach, the mask may be defined by removing portions a layer that is at least partially opaque or substantially opaque so as to permit passage of predetermined portions of light emitted by the illuminable patch to yield the predetermined image. For example, a metal foil layer with removed portions may be provided between the illuminable patch and the first core layer.

As noted, a phosphorescent patch may be provided in overlapping relation to the illuminable patch so as to fluoresce upon illumination of the illuminable patch, e.g. between the illuminable patch and the mask. The phosphorescent patch may have substantially the same configuration as the configuration of the illuminable patch. In one approach, the phosphorescent patch may be supportably interconnected to an upward-facing side of the second carrier layer in opposing relation to the illuminable patch. In another approach, the phosphorescent patch may be supportably interconnected to the downward facing t side of the second carrier layer, with the illuminable patch supportably disposed thereupon.

In contemplated embodiments, the card body may further include a second core layer interconnected to the downward-facing side of the first carrier layer, i.e. on a side opposite to the second carrier layer, and/or a metal layer (e.g. a metal foil layer) interconnected to the first carrier layer on the downward-facing side, i.e. opposite to the second carrier layer. In conjunction with such embodiments, the first core layer and the second core layer and/or metal layer may be of a common peripheral configuration so that each layer extends continuously around a peripheral edge of the illuminable card.

In some arrangements, a film layer(s) may be interconnected to either or both of the downward-facing side of the first carrier layer and/or the upward-facing side of the second carrier layer in overlapping relation the components supportably interconnected to the first carrier layer and second carrier layer (e.g. first and second contact pads, illuminable patch, optional first antenna, optional phosphorescent patch, optional second antenna referenced below, etc.) to define a pre-laminated inlay. For example, transparent film layers may be adhesively attached to and cover the entirety of the downward-facing side of the first carrier layer and upward-facing side of the second carrier layer and supported components, thereby providing a pre-laminated inlay to facilitate assembly and interconnection (e.g. via lamination) with additional layers of the illuminable card (e.g. second core layer, metal layer, outer protective layers, adhesive and/or thermoset interconnecting layers, etc.).

The first core layer, second core layer, and protective, outer film layers may comprise a polymer-based material (e.g. polyvinyl chloride, polyethylene terephthalate, polyethylene terephthalate glycol-modified, polyester, and/or polycarbonate). Further, the first and second carrier layers may comprise a polymer-based material (e.g. polyethylene terephthalate and/or polycarbonate). Additionally, the various layers described herein may be interconnected via lamination, with thermo-adhesive polymer-based layers and/or thermosetting, polymer-based layers disposed between adjacent one of the layers.

In some arrangements, the illuminable patch may comprise a substantially clear, electrically-conductive layer supportably disposed on a carrier layer for electrical coupling with a first contact pad (e.g. direct or capacitive coupling), or rail, provided on the same or another carrier layer, an intermediate layer comprising a plurality of illuminable diodes supportably disposed on the electrically-conductive layer, and an electrically-conductive pad supportably disposed on the intermediate layer for electrical coupling with a second contact pad (e.g. direct or capacitive coupling), or rail, provided on the same or another carrier layer. In the later regard, the electrically-pad may be electrically isolated from the electrically-conductive layer by a layer of electrically non-conductive material disposed therebetween.

The present disclosure further encompasses method embodiments and multiple card embodiments in which a plurality of illuminable cards are provided, wherein each of the cards may include:

a commonly-configured card body including:
an electrically non-conductive carrier layer; and,
a first core layer overlying and interconnected to the carrier layer,
wherein the first core layer is at least partially light transmissive; and,
commonly-configured, electrically-conductive first and second contact pads, or rails, supportably interconnected to said carrier layer in opposing, spaced relation to one another, for receiving a power signal from one of an external power supply and an on-board power supply.

Further, for a first portion of said plurality of illuminable cards each corresponding illuminable card may include:
a commonly-configured first illuminable patch, supportably disposed for electrical coupling with the corresponding first and second contact pads, or rails, for illumination upon receipt of a power signal at the corresponding first and second contact pads, or rails; and,
a commonly-configured first mask overlying at least a portion of the corresponding first illuminable patch and defining a first predetermined image visible on a first side of the illuminable card upon illumination of the corresponding first illuminable patch.

Additionally, for a second portion of the plurality of illuminable cards, each corresponding illuminable card further may include:
a commonly-configured second illuminable patch, supportably disposed for electrical coupling with the corresponding first and second contact rails for illumination upon receipt of a power signal at the corresponding first and second contact pads, or rails; and,
a commonly-configured second mask overlying at least a portion of the corresponding second illuminable patch and defining a second predetermined image visible on a first side of the illuminable card upon illumination of the corresponding second illuminable patch, wherein said commonly-configured first mask and first predetermined image are different from said commonly-configured second mask and said second predetermined image, respectively.

In some embodiments, for each illuminable card of the first portion of the plurality of illuminable cards the corresponding commonly-configured first illuminable patch may be disposed in a common first location relative to the corresponding first and second contact pads, or rails. Further, for each illuminable card of the second portion of the plurality of illuminable cards the corresponding commonly-configured second illuminable patch may be disposed in a common second location relative to the corresponding first and second contact pads, or rails, wherein said first relative location said second relative location are different.

In some implementations, the commonly-configured first illuminable patch and the commonly configured second illuminable patch may be different configurations. In turn, the commonly-configured first illuminable patch and the commonly configured second illuminable patch may be provided to define substantially common electrical loads (e.g. by comprising common areas and common materials).

In some embodiments, for each illuminable card of the first portion of the plurality of illuminable cards common first printing (e.g. the same graphics and/or human-readable printing) may be provided on the corresponding first core layer, and for each illuminable card of the second portion of the plurality of illuminable cards common second printing (e.g. the same graphics and/or human-readable printing)

may be provided on the corresponding first core layer, wherein said first common printing and second common printing are different.

In such method and multiple card embodiments, the illuminable cards comprising the first portion of the plurality of card may have additional first common card features as described in relation to any of the illuminable card embodiments described herein, with the exception of visible account indicia and other personalization data, and the illuminable cards comprising the second portion of the plurality of cards may have additional second common card features as described in relation to any of the illuminable card embodiments described herein, with the exception of visible account indicia and other personalization data. As may be appreciated, one or more of such additional first common card features and additional second common card features may be different.

Numerous additional features and advantages of the present invention will become apparent to those skilled in the art upon consideration of the embodiment descriptions provided hereinbelow.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
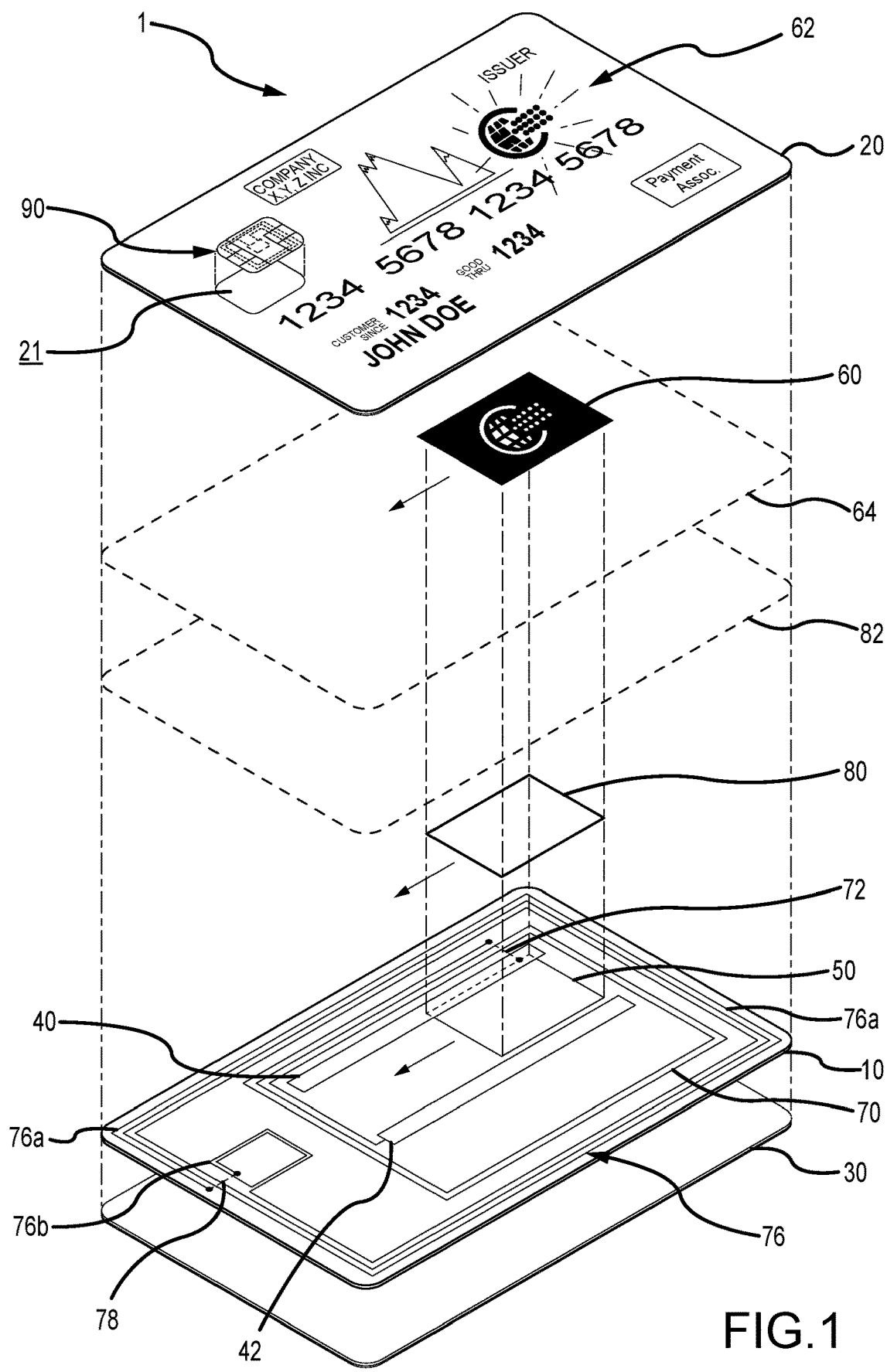
FIG. 1 is an exploded assembly view of one embodiment of an illuminable card.

FIG. 1 is an exploded assembly view of one embodiment of an illuminable card 1 that includes a card body comprising an electrically non-conductive carrier layer 10, and a first core layer 20 overlying and interconnected to an upward-facing side of the carrier layer 10. In some implementations, the first core layer 20 may be at least partially light transmissive (e.g. transparent or translucent) or opaque. The illuminable card 1 further includes electrically-conductive first and second contact pads 40, 42, defined by corresponding rails in the illustrated embodiment, supportably interconnected to the carrier layer 10 in opposing, spaced relation to one another for receiving a power signal. Additionally, the illuminable card 1 includes an illuminable patch 50 supportably interconnected to the carrier layer 10 to provide an electrical current pathway between the first and second contact rails 40, 42, wherein the illuminable patch illuminates upon receipt of a power signal at the first and second contact rails 40, 42. Such illumination may be provided through the first core layer 20 on a first side of the illuminable card 1 and/or through a peripheral edge of the illuminable card 1. The illumination may be provided for aesthetic and/or for functional purposes. For example, the illumination may provide a visual indication associated with an intended functional use of the illuminable card and/or may provide or otherwise highlight a desired visual image.

As shown, the illuminable card 1 may also include a mask 60 overlying at least a portion of the illuminable patch 50 and defining a predetermined image 62 on the first side of the illuminable card 1 upon illumination of the illuminable patch 50. As will be further described, the mask 60 permits passage of and blocks passage of different portions of the illumination to provide the predetermined image 62.

In the embodiment shown in FIG. 1, a first antenna 70 may also be included in illuminable card 1 to receive a contactless signal from an external source of radio-frequency radiation, and to provide the power signal at the first and second contact rails 40, 42. In that regard, first antenna 70 may comprise a continuous length of metal defining one or more loops and having offset locations (e.g. opposing ends) interconnected to different ones of the first and second contact rails 40, 42. As shown, first antenna 70 may also be supportably interconnected to the carrier layer 10, and may be disposed to extend about the first and second contact rails 40, 42 and illuminable patch 50.

In that regard, the first and second contact rails 40, 42, the illuminable patch 50, and the first antenna 70 may be disposed on and supportably interconnected to a common side of carrier layer 10. For example, and as shown in FIG. 1, the first and second contact rails 40, 42, the illuminable patch 50, and the first antenna 70 may be disposed on and supportably interconnected to a downward-facing, first side of carrier layer 10, with metallic cross-connection bridges between first antenna 70 and first and second rails 40, 42 being provided on and through the carrier layer 10. In other embodiments, the first antenna 70 may be disposed on an upward-facing, second side of carrier layer 10, opposite to the first side thereof, with metallic cross-connection bridges between first antenna 70 and first and second rails 40, 42 being provided on and through the carrier layer 10. By way of example, and as shown in FIG. 1, a metallic bridge 72 (shown in phantom) may be disposed on and supportably interconnected to carrier layer 10, wherein metallic cross-connections may be provided through carrier layer 10 between an end of first antenna 70 and first contact rail 40.

In some arrangements, the first and second contact rails 40, 42, first antenna 70, and bridge 72 may be defined by metallic layer(s) supportably disposed on carrier layer 10 (e.g. via plating and etching operations). In other arrangements, the first and second contact rails 40, 42, antenna 70, and bridge 72 may be defined by metallic wire supportably disposed on and partially embedded in the carrier layer 10.

In some embodiments, the first and second contact rails 40, 42 and the illuminable patch 50 may be provided to facilitate positioning of the illuminable patch 50 at any one of a plurality of different positions relative to the first and second contact rails 40, 42 during manufacture, wherein the illuminable patch is functional for illumination at any one of the positions. In that regard, opposing edge portions of the first and second contact rails 40, 42 may have corresponding lengths in a first dimension that are greater than a maximum cross-dimension of the illuminable patch 50 in the first dimension. Additionally or alternatively, the opposing edge portions of the first and second contact rails 40, 42 may have corresponding lengths in a first dimension that are greater than the lengths of adjacent, corresponding edge portions of the illuminable patch 50 in the first dimension, as shown in FIG. 1.

Further, the opposing edge portions of the first and second contact rails 40, 42 may extend coincidentally and/or in equispaced spaced relation along the corresponding lengths thereof. For example, in the embodiment shown in FIG. 1, the first and second contact rails 40, 42 may extend in substantially parallel relation to each other and in relation to a peripheral edge of the illuminable card 1. Additionally, the first and second contact rails 40, 42 may each have a corresponding substantially constant width along the corresponding lengths thereof.

As shown in FIG. 1, a first part of the edge portion of the first contact rail 40 may be overlapped by the corresponding edge portion of the illuminable patch 50, wherein a second part of the first contact rail 40 extends beyond the corresponding edge portion of the illuminable path in the first dimension noted above (e.g. the second part may extend in either or both directions beyond the overlapped, first part in the first dimension). To facilitate positioning of the illuminable patch 50 at a number of different positions relative to first and second contact rails 40, 42 during manufacture, the non-overlapped, second part may have a corresponding total length in the first dimension that is at least 50%, and in some embodiments at least 200%, of a length of the overlapped, first part in the first dimension.

The illuminable patch 50 may assume a range of different configurations, including a polygonal configuration (e.g. a rectangular configuration as shown and described in relation to FIG. 1, FIG. 7 and FIG. 9 below), or an ellipsoid configuration (e.g. a circular configuration as shown and described below in relation to FIG. 6), or an elongate configuration (e.g. a rectangular frame-like configuration as shown and described below in relation to FIG. 8).

In at least some contemplated applications in which a plurality of illuminable cards 1 are provided that have different corresponding designs, it may be desirable to employ corresponding illuminable patches 50 having configurations that each present a substantially common electrical load upon receipt of a substantially common power signal. In that regard, in some implementations the material (s) utilized to define the illuminable patches 50 may be substantially the same for each of the illuminable cards 1, thereby providing for a substantially common load per unit area upon illumination. Further, the illuminable patches 50 may be of a substantially common area. Such approach is of particular benefit for applications in which the plurality of illuminable cards 1 with different corresponding designs are intended for use with external sources of radio-frequency electromagnetic radiation that provide contactless power signals at the same or substantially the same frequency (e.g. a contactless transaction card reader provided for signal transmissions to/from contactless transaction cards at a frequency of about 13.56 Mhz).

As may be appreciated, the mask 60 may define a predetermined pattern that blocks and permits passage of predetermined portions of the light emitted by the illuminable patch 50 to define the predetermined image 62. For example, mask 60 may be provided to permit a greater degree of light passage through a pattern area corresponding with human-readable characters and other configurations corresponding with a given logo, name, character, scene or other image selected by a given customer.

As shown in FIG. 1, the mask 60 may be disposed in overlying, corresponding relation to any of the positions at which the illuminable patch 50 may be located during manufacture, between the illuminable patch 50 and the overlying first core layer 20. In one approach, the mask 60 may be defined as part of an optional print layer 64 that may be provided on an inward-facing side of the first core layer 20. For example, the print layer 64 may comprise an opaque or substantially opaque ink layer (e.g. an ink of any desired color) that is printed across at least a predetermined portion of an inward-facing side of the first core layer 20 so as to extend about and thereby define the predetermined pattern of the mask 60, thereby allowing for light passage through the predetermined pattern. In that regard, the print layer 64 may be provided to comply with visual opacity requirements of ISO/IEC Standard 7810. In one approach, the print layer may extend across the entirety of an inward-facing side or outward-facing side of the first core layer 20, with exception of the predetermined pattern of the mask 60. In another approach, the mask 60 may be supportably interconnected to the carrier layer 10 in overlying relation to the illuminable patch 50.

In various embodiments, illuminable card 1 may include one or more additional features. For example, an optional phosphorescent patch 80 may be supportably disposed on the carrier layer 10 in overlying, corresponding relation to any of the positions at which the illuminable patch 50 may be located during manufacture, between the underlying illuminable patch 50 and the overlying mask 60. In such embodiments the phosphorescent patch 80 may have substantially the same configuration as the illuminable patch 50.

In one approach, phosphorescent patch 80 may be defined by a coating comprising a phosphorescent material that is supportably interconnected to the carrier layer 10 in overlying relation to the illuminable patch 50. For example, and as shown in FIG. 1, a phosphorescent patch 80 may be supportably disposed on the upward-facing, second side of carrier layer 10, in overlapping relation to the illuminable patch 50 disposed on the downward-facing, first side of carrier layer 10. The phosphorescent patch 80 may be provided to effectively convert a visible blue tone illumination of diodes comprising illuminable patch 50 to a visible white tone illumination, thereby further enhancing the aesthetic and/or functional features of the illuminable card 1.

As an additional optional feature, illuminable card 1 may include a translucent layer 82 that is located in overlying relation to the illuminable patch 50, between the illuminable patch 50 and the overlying mask 60, and that includes at least a portion to a peripheral edge of the illuminable card 1. In turn, a portion of light emitted by the illuminable patch 50 may be internally reflected within the translucent layer 82 and thereby directed to the peripheral edge of the illuminable card 1 to illuminate the peripheral edge. In one approach, the translucent layer 82 may comprise a sheet-like layer that comprises a translucent, polymer-based material (e.g. a material comprising an acrylic polymer, a polycarbonate polymer, or the like), and that extends to a peripheral edge that extends about the entirety of the peripheral edge of the illuminable card 1. In some embodiments, a translucent, polymer-based material may be utilized that also comprises a fluorescent pigment, or dye, that may be clear or colored for a given application.

As an additional optional feature, illuminable card 1 may include a film layer(s) (not shown), interconnected to either or both sides of the carrier layer 10 in overlapping relation to the first and second contact rails 40, 42, illuminable patch 50, first antenna 70, and/or phosphorescent patch 80 (if included), so as define a pre-laminated inlay. For example, a separate film layer may be adhesively attached to and cover the entirety of each side of the carrier layer 10, thereby yielding a pre-connected assembly. The film layer(s) may be transparent to allow for the passage of light emitted by illuminable patch 50 therethrough. Additionally, printing may be provided on the film layer(s). For example, a printed mask 60 may be provided in overlapping relation to illuminable patch 50 (e.g. printed as part of a print layer in a manner analogous to print layer 64 described herein). The film layer(s) may comprise polymer-based materials.

In contemplated embodiments, the card body of illuminable card 1 may further include one or a plurality of additional layers disposed on a downward-facing side of the carrier layer 10 (e.g. on an opposing side to the first core layer 20). For example, and as shown in FIG. 1, an optional second core layer 30 may be interconnected to a downward-facing side of the carrier layer 10. As will be further described below, printing may be provided on either or both of the first core layer 20 and second core layer 30, wherein such printing is visible from a first side and/or second side of the illuminable card. In turn, a protective, transparent outer film layer(s) may be provided on an outward-facing side of each of the first core layer 20 and second core layer 30 (if provided). In some embodiments, one or both of the outer film layer(s) may be laser engravable to facilitate the provision of personalization data, as discussed herein.

The first core layer 20 (e.g. about 0.006 to 0.01 inch thick), second core layer 30 (e.g. about 0.006 to 0.01 inch thick), and protective, outer film layers may comprise a polymer-based material (e.g. polyvinyl chloride, polyethylene terephthalate, polyethylene terephthalate glycol-modified, polyester, and/or polycarbonate). Further, the carrier layer 10 (e.g. about 0.006 to 0.012 inch thick) may comprise a polymer-based material (e.g. polyethylene terephthalate and/or polycarbonate). Additionally, the various layers described herein may be interconnected via lamination, with thermo-adhesive polymer-based layers or thermosetting, polymer-based layers disposed between adjacent one of the layers.

The illuminable card 1 may be provided in a variety of forms. For example, the illuminable card 1 may be provided as a collector card, an identity card, an access card, a loyalty card, a membership card, a transit card, or a transaction card. In the later regard, and as shown in FIGS. 1, 2A and 2B, illuminable card 1 may be provided with additional features for use as a transaction card.

Figure 2A:
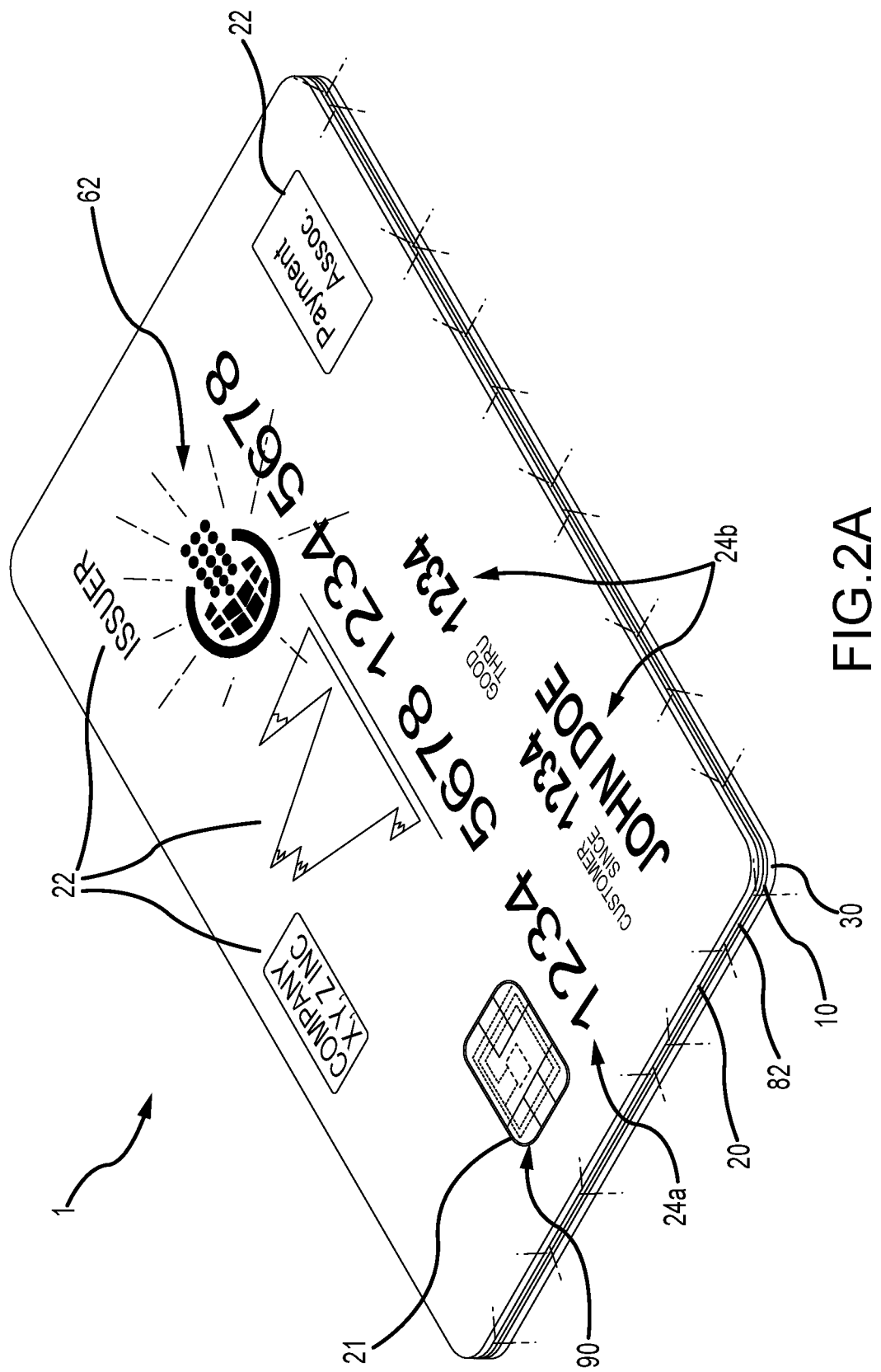
FIG. 2A is a front perspective view of the illuminable card embodiment of FIG. 1.
Figure 2B:
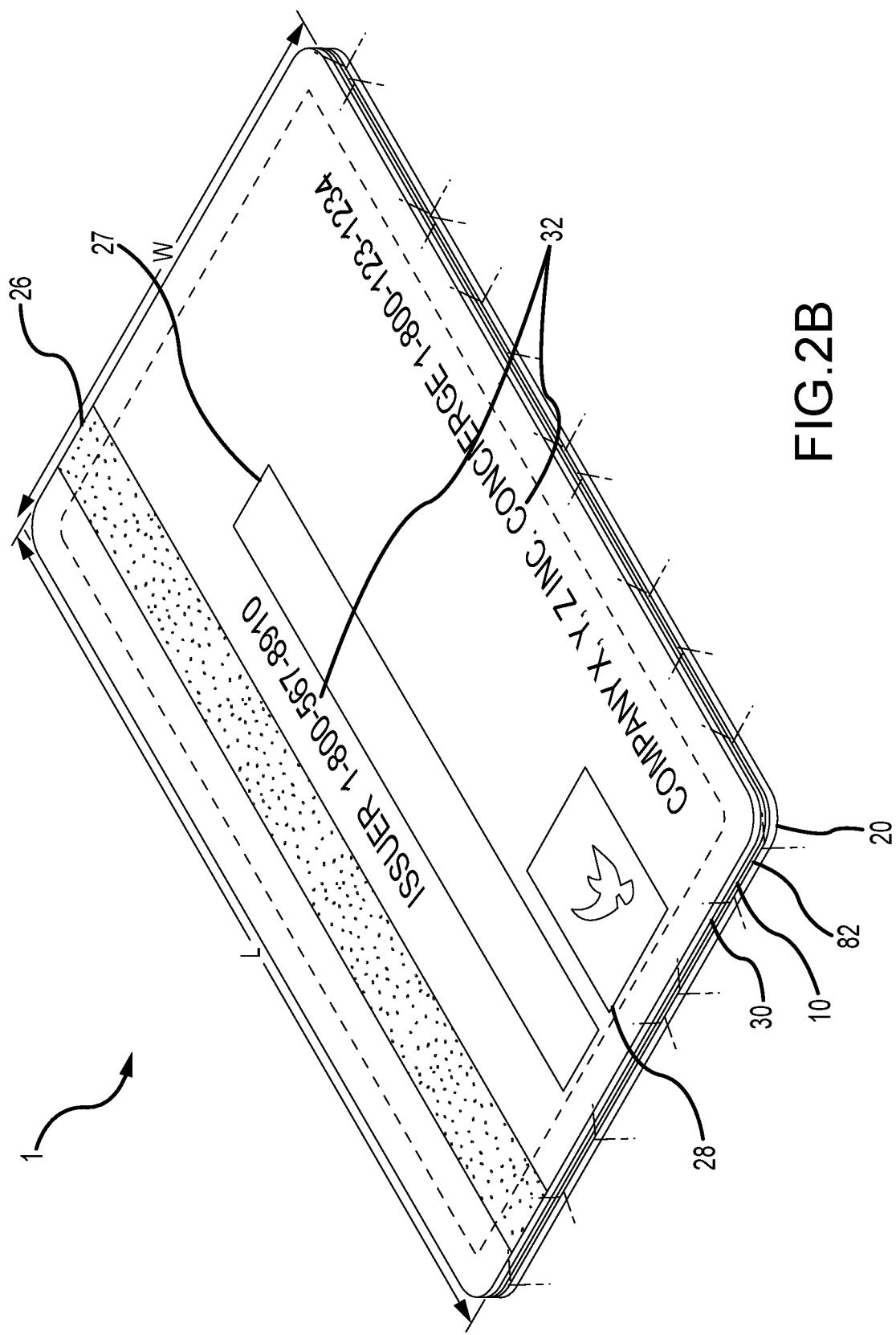
FIG. 2B is a back perspective view of the illuminable card embodiment of FIG. 1.

In particular, and as shown in FIG. 2B, the card body of illuminable card 1 may define a card configuration having at a length L, a width W and a thickness in compliance with ISO/IEC Standard 7810. In that regard, the first core layer 20, the second core layer 30 (if provided), and the outer film layer(s) (if provided) may each be of a common length and width, in compliance with ISO/IEC Standard 7810, and thereby accommodating lamination of such layers in an interconnected assembly. Additionally, and as shown in FIG. 1, the carrier layer 10, and optional translucent layer 82 and pre-laminated inlay film layers, may each be of the same length and width, in compliance with ISO/IEC Standard 7810, and thereby accommodating lamination of such layers in an interconnected assembly.

Further, in the transaction card form illustrated in FIGS. 1, 2A and 2B, the illuminable card 1 may include a number of features to accommodate use with magnetic stripe card reader and/or a contact chip card reader and/or a contactless chip card reader. In particular, and as shown in FIG. 1, an integrated circuit (IC) chip module 90 (e.g. including at least an IC chip) and a second antenna 76 may be included for contactless signal transmissions to/from a contactless chip card reader, e.g. radio-frequency radiation signals that provide a power/data signal to the IC chip module 90 via second antenna 76 and that provide a power signal at first and second contact rails 40, 42 via first antenna 70. As may be appreciated, such contactless signals may provide for data transmissions between the contactless chip card reader and the IC chip module 90 (e.g. data transmissions attendant to the completion of a payment transaction utilizing the illuminable card 1). In that regard, the IC chip module 90 and second antenna 76 may be provided for operation in compliance with ISO/IEC Standard 14443.

In the embodiment shown in FIG. 1, the second antenna 76 may comprise a continuous length of metal supportably interconnected to the carrier layer 10 and defining one or more outer loop(s) 76a. In one approach, the outer loops(s) 76a may be disposed to extend about the first antenna 70, the first and second contact rails 40, 42, and illuminable patch 50 on the first side of the carrier layer 10, e.g. the outer loops(s) 76a may extend about a peripheral edge portion of the carrier layer 10. In other embodiments, the second antenna 76 may be correspondingly disposed on and supportably interconnected to the second side of carrier layer 10.

In some arrangements, the second antenna 76 may be defined by metallic layer(s) supportably disposed on carrier layer 10 (e.g. via plating and etching operations). In other arrangements, the second antenna 70 may be defined by metallic wire supportably disposed on and partially embedded in the carrier layer 10.

Various approaches may be utilized to provide for electrical coupling between the second antenna 76 and the IC chip module 90. For example, in some approaches the IC chip module 90 may be embedded within the illuminable card 1 and directly interconnected to the second antenna 76 (e.g. two opposing ends of the outer loop(s) 76a may be electrically interconnected to different ones of a plurality of contacts provided on an IC chip of the IC chip module 90).

In the approach shown in FIGS. 1 and 2A the illuminable card 1 may include a pocket 26 that extends in to a first side of the illuminable card 1 and that is adapted to receive the IC chip module 90 for electrical coupling with the second antenna 76. In some implementations, the IC chip module 90 may include an electrically non-conductive substrate, an IC chip supportably interconnected to an inward-facing side of the substrate, and a plurality of contact pads supportably interconnected to an outward-facing side of the substrate and electrically interconnect through the substrate to different ones of a plurality of contacts of the IC chip. In the later regard, the plurality of contact pads may be provided for contact signal transmissions to/from a contact chip card reader, e.g. electrical signals that provide power to the IC chip module 90 and that provide for data transmission between the contact chip card reader and the IC chip module 90 (e.g. data transmissions attendant to the completion of a payment transaction utilizing the illuminable card 1). In that regard, the IC chip module 90 and plurality of contact pads may be provided for operation in compliance with ISO/IEC Standard 7816. As may be appreciated, in such implementations the illuminable card 1 may be utilized as a dual interface transaction card.

In some arrangements, the IC chip module 90 may further include a coupling antenna supportably interconnected to an inward-facing side of the substrate and electrically interconnected to the IC chip of the IC chip module 90. For example, coupling antenna may comprise a continuous length of metal defining one or more loop(s) extending about the IC chip and electrically interconnected to different ones of a plurality of contacts of the IC chip. In turn, the second antenna 76 may be provided for inductive coupling with the coupling antenna of the IC chip module 90. More particularly, and as shown in FIG. 1, second antenna 76 may include one or more inner loop(s) 76b, wherein the outer loop(s) 76a and inner loop(s) 76b are defined by the continuous length of metal. The inner loop(s) 76b may be disposed so that, when the IC chip module 90 is secured in the pocket 26, the inner loop(s) 76b and the coupling antenna of the IC chip module 90 are positioned in opposing, spaced relation for inductive coupling. As shown in FIG. 1, a metallic bridge 78 (shown in phantom) may be supportably interconnected to an upward-facing, second side of carrier layer 10, wherein metallic cross-connections may be provided through carrier layer 10 to electrically interconnect an end of outer loop(s) 76a and an end of inner loop(s) 76b.

In another approach, the IC chip module 90 may be provided for direct or inductive coupling with the first antenna 70, free from inclusion of a second antenna 76. In such arrangements, the first antenna 70 may be utilized to receive contactless RF signals from a contactless card reader to provide a power signal at first and second contact rails 40, 42, and to provide a power/data signal to the IC chip of IC chip module 90.

In some arrangements, the second antenna 76, first and second contact rails 40, 42, first antenna 70, and bridge 72 (if necessary) may be defined by metallic layer(s) supportably disposed on carrier layer 10 (e.g. via plating and etching operations). In other arrangements, the second antenna 76, first and second contact rails 40, 42, antenna 70, and bridge 72 (if necessary) may defined by metallic wire that is supportably disposed on and partially embedded in the carrier layer 10.

Reference is now made to FIGS. 2A and 2B which illustrate optional printing 22 visible from a first side of the illuminable card 1 and optional printing 32 visible from a second side of the illuminable card 1, respectively. Printing 22 and/or 32 may comprise one or more predetermined print regions that include corresponding graphics (e.g. a pictorial scene, a logo, a photo, etc.), corresponding human-readable characters (e.g. numbers, letters, and/or representations thereof) and/or one or more corresponding machine-readable markings (e.g. a bar code, a multi-dimensional matrix code, etc.), as described in relation to print layer 64. As shown, printing 22 may be provided in offset relation to the mask 60. In that regard, some or all of the printing 22 may be provided as a portion of the print layer 64, wherein the print layer 64 may be defined in a continuous printing operation utilizing a plurality of print stations.

Printing 22 may be forward printed on an outward-facing side of the transparent first core layer 20 (e.g. regardless of whether the first core layer 20 is transparent, translucent or opaque), or reverse printed on an inward-facing side of the transparent first core layer 10. Similarly, printing 32 may be forward printed on an outward-facing side of the second core layer 30 (e.g. regardless of whether the second core layer 30 is transparent, translucent or opaque), or reverse printed on an inward-facing side of the second core layer 30 if the second core layer 30 is transparent.

As shown in FIG. 2A, illuminable card 1 may also include personalization data 24a, 24b comprising visible indicia indicative of or otherwise corresponding with an account or record uniquely associated with the illuminable card 1 (e.g. a payment account administered by or on behalf of a card issuer payment institution, a membership account administered by card issuer merchant institution, etc.). In some embodiments, visible personalization indicia 24a and/or 24b may be provided by embossing the card body of the illuminable card 1 to define the indicia. In other embodiments, visible personalization indicia 24a and/or 24b may be defined by printing on one or both of the first core layer 20 and/or second core layer 30. In still other embodiments, visible personalization indicia 24a and/or 24b may be defined at an outward-facing surface of the illuminable card 1 (e.g. by at least one of laser engraving, ink jet printing and thermoprinting).

The visible personalization indicia 24a may comprise human-readable characters indicative of a corresponding account (e.g. account number). Further, visible personalization indicia 24b may include additional human-readable data corresponding with a given account, including a corresponding card expiration date, a corresponding account service grade level, and/or corresponding customer-specific data (e.g. customer name, customer duration, data, etc.). In the illuminable card 1 embodiment of FIGS. 2A and 2B, visible indicia 24a, 24b are provided for viewing from a first side of the transaction card 1. In other embodiments, visible indicia 24a and/or 24b may be also or alternately provided for viewing from the second side of the transaction card 1. As may be appreciated, the visible indicia 24a, 24b may be provided as personalization data on illuminable card 1 as a part of card personalization processing.

As shown in FIG. 2B, illuminable card 1 may also include a magnetic stripe 26 affixed to the second side of the illuminable card 1. The magnetic stripe 26 may be encoded during card personalization with personalization data unique to the illuminable card 1 (e.g. data corresponding with the account indicated by visible indicia 24a). The magnetic stripe 26 may be provided in compliance with ISO/IEC Standard 7811. As further shown, a signature block 27 and/or hologram 28 may also be affixed to the second side of the transaction card 1 (e.g. via hot-stamping).

Figure 3:
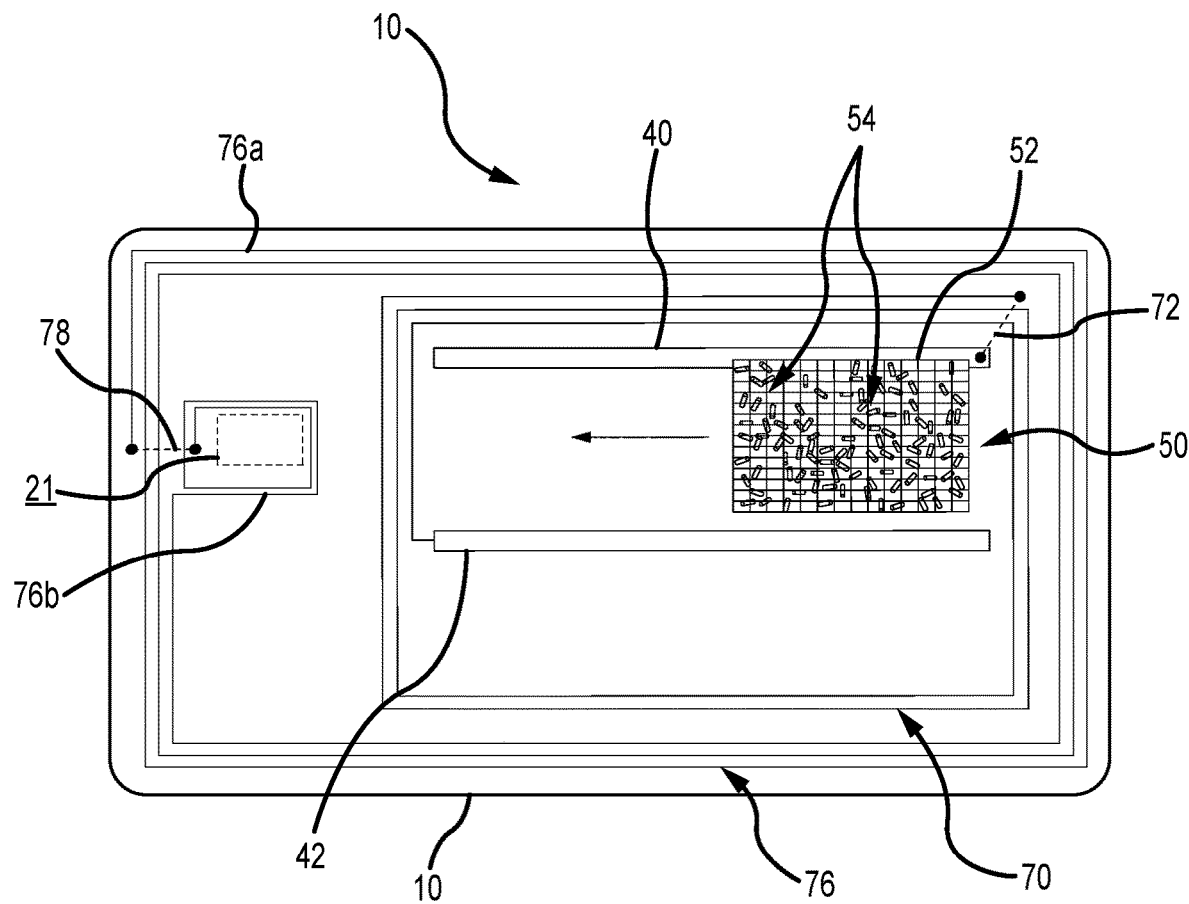
FIG. 3 is a bottom plan view of a carrier layer and supported components of the illuminable card embodiment of FIG. 1.

Reference is now made to FIG. 3 which illustrates a bottom view of the carrier layer 10 shown in FIG. 1 (i.e. the first side of the carrier layer 10), together with the first and second contact rails 40, 42, the illuminable patch 50, the first antenna 70, and the second antenna 76, as supportably interconnected to the downward-facing, first side of the carrier layer 10. In the illustrated embodiment, the illuminable patch 50 may include a plurality of illuminable diodes 54 disposed between the first and second contact rails 40, 42, and an electrically-conductive matrix 52 disposed over the plurality of diodes 54 between the first and second contact rails 40, 42, wherein the plurality of illuminable diodes illuminate when a power signal is received at the first and second contact rails 40, 42. In one approach, the plurality of illuminable diodes 54 may be provided by disposing a suspension that comprises the diodes on a surface of the carrier layer 10. In turn, the electrically-conductive matrix 52 may be provided by disposing another suspension that comprises metallic particles (e.g. silver-containing particles) over the plurality of diodes 54. As shown, the electrically-conductive matrix 52 may overlap and thereby directly contact the first contact rail 40, and may be slightly spaced from the second contact rail 42.

As shown in FIG. 3, illuminable patch 50 may be advantageously located at any of a continuum of locations along the first and second contacts 41, 42. Such locations may extend across a length of the carrier layer 10, and correspondingly across a corresponding length of the illuminable card 1, thereby facilitating customized placement for a given customer and associated mask design.

Figure 4A:
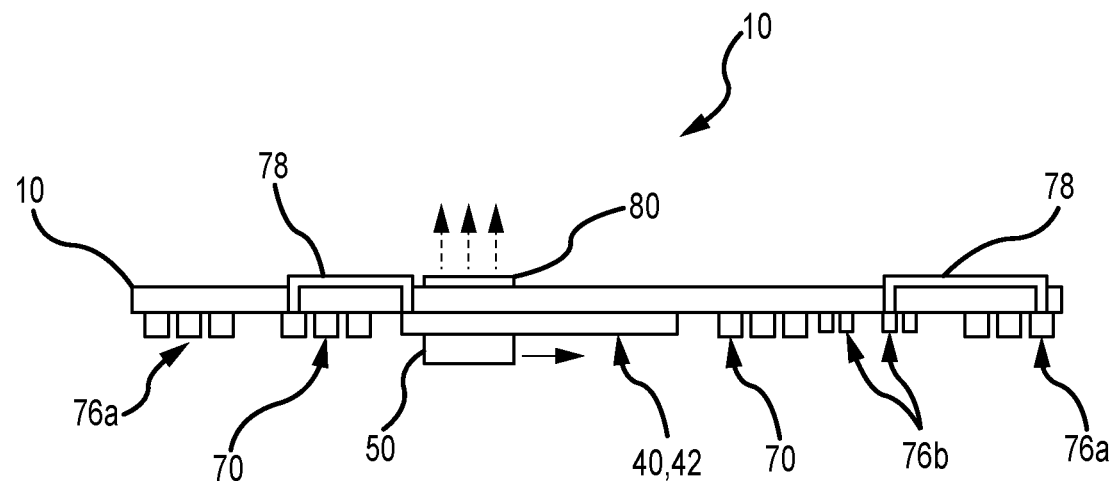
FIG. 4A is a schematic side cross-sectional view of the carrier layer and supported components of the illuminable card embodiment of FIG. 1.
Figure 4B:
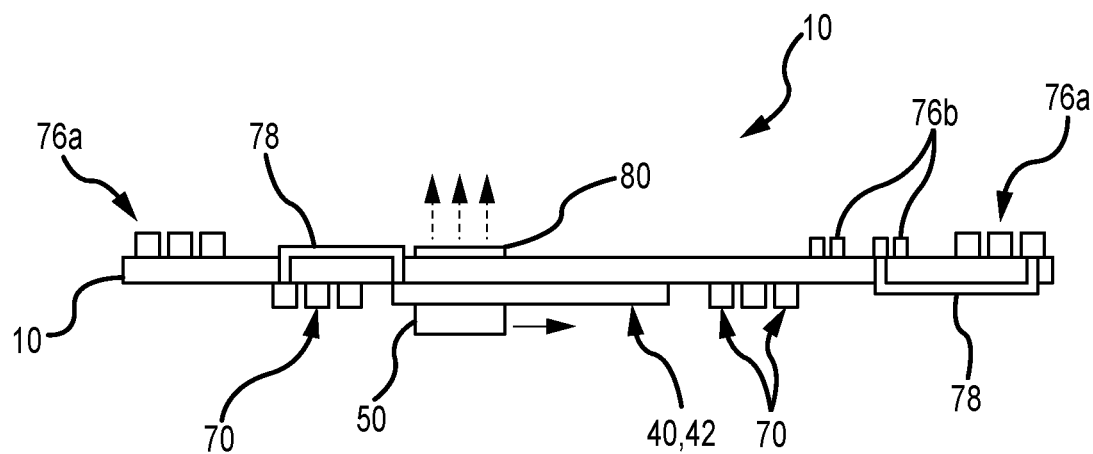
FIG. 4B is a schematic side cross-sectional view of a carrier layer and supported components of another illuminable card embodiment.

FIG. 4A illustrates a schematic, side cross-sectional view of the carrier layer 10 and supportably interconnected components shown in FIG. 3. As illustrated, the first and second contact rails 40, 42, illuminable patch 50, first antenna 70, and second antenna 76 (i.e. as defined by outer loops 76*a* and inner loops 76*b*) may be supportably disposed on the downward-facing, first side of carrier layer 10. In turn, bridge 72 and bridge 78 may be supportably disposed on the second side of carrier layer 10 and may extend therethrough to establish the illustrated cross-connections, otherwise described herein. FIG. 4A further illustrates the optional inclusion of a phosphorescent patch 80, supportably interconnected to the upward-facing, second side of carrier layer 10 in overlapping relation to illuminable patch 50. FIG. 4B illustrates a schematic, side cross-sectional view of a modified embodiment of the carrier layer 10 and supportably interconnected components shown in FIGS. 3 and 4A. As shown, second antenna 76 and bridge 78 are supportably disposed on the upward-facing, second side of carrier layer 10 (e.g. in non-overlapping relation to first antenna 70).

Figure 5:
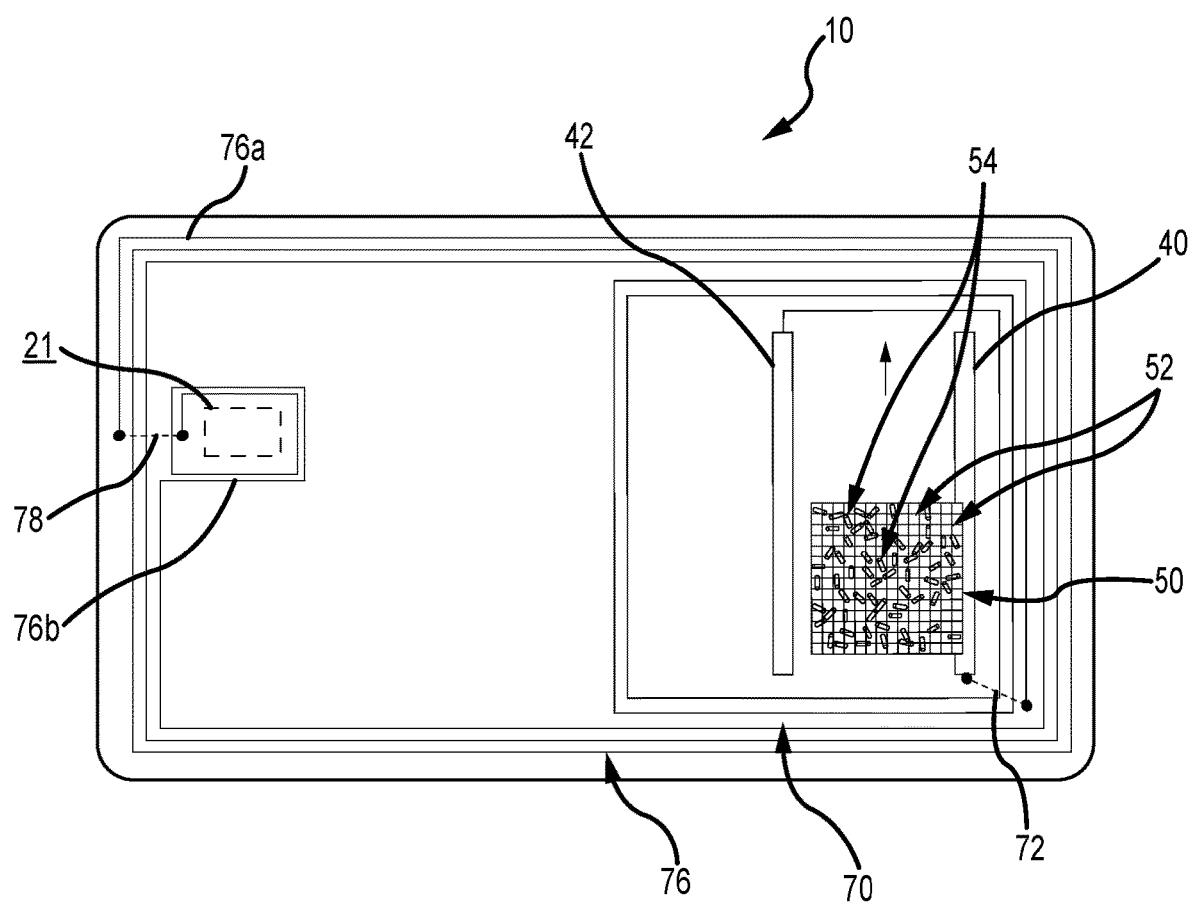
FIG. 5 is a bottom plan view of a carrier layer and supported components of another illuminable card embodiment.
Figure 6:
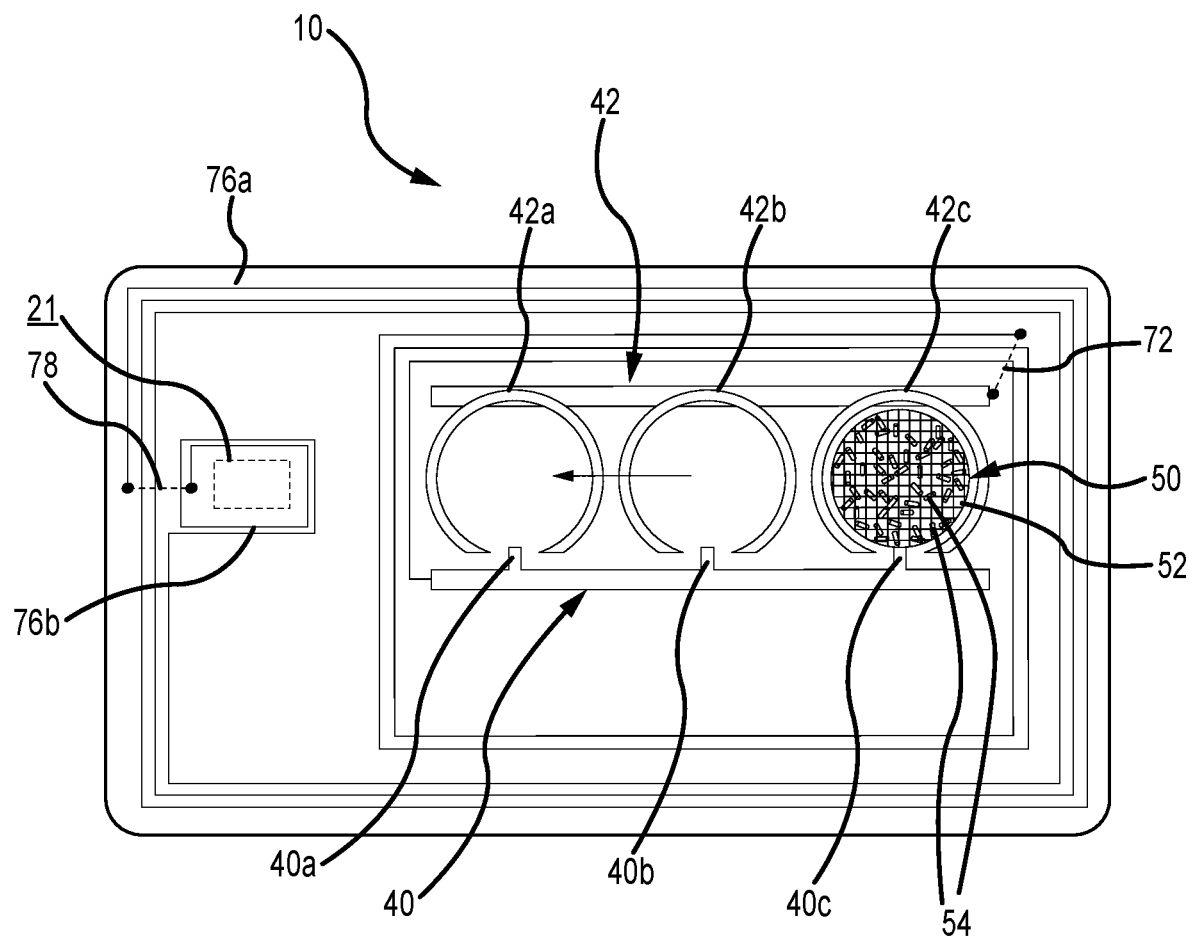
FIG. 6 is a bottom plan view of a carrier layer and supported components of another illuminable card embodiment.

In view of the unique customization opportunities afforded by the present invention, numerous additional embodiments can be recognized. For example, FIGS. 5 and 6 illustrate bottom views of modified embodiments of the carrier layer 10 shown in FIG. 1 (i.e. the first side of the carrier layer 10), together with first and second contact rails 40, 42, illuminable patch 50, first antenna 70, and second antenna 76, as supportably interconnected to the first side of the carrier layer 10. In such modified embodiments, the illuminable patch 50 may include a plurality of illuminable diodes 54 disposed between the first and second contact rails 40, 42, and an electrically-conductive matrix 52 disposed over the plurality of diodes 54 between the first and second contact rails 40, 42, wherein the plurality of illuminable diodes illuminate when a power signal is received at the first and second contact rails 40, 42. In one approach, the plurality of illuminable diodes 54 may be provided by disposing a suspension that comprises the diodes on a surface of the carrier layer 10. In turn, the electrically-conductive matrix 52 may be provided by disposing another suspension that comprises metallic particles (e.g. silver-containing particles) over the plurality of diodes 54. As shown, the electrically-conductive matrix 52 may overlap and thereby directly contact the first contact rail 40, and may be slightly spaced from the second contact rail 42.

As shown in FIG. 5, illuminable patch 50 may be advantageously located at any of a continuum of locations along the first and second contact rails 41, 42. Such locations may extend across a width of the carrier layer 10, and correspondingly across a corresponding width of the illuminable card 1, thereby facilitating customized placement for a given customer and associated mask design.

As shown in FIG. 6, a plurality of sets of first and second contact pads 40*a* and 42*a*, 40*b* and 42*b*, 40*c* and 42*c*, may be supportably interconnected to carrier layer 10 to facilitate positioning of illuminable patch 50 at any of a corresponding plurality of locations, thereby facilitating customized placement for a given customer and associated mask design. For example, and as shown in FIG. 6, each set of contact pads may include a stub-like first contact pad 40*a*, 40*b* and 40*c*, and a corresponding, complex-shaped second contact pad 42*a*, 42*b* and 42*c* (e.g. an annular, ring-shaped configuration as shown in FIG. 6), configured to extend in slightly spaced relation along at least a portion of a coincidentally-shaped illuminable patch 50. Such an approach advantageously provides for multi-location positioning of illuminable patch 50, while also accommodating a complex-shaped illuminable patch 50, as may be desirable for a given implementation.

Figure 7:
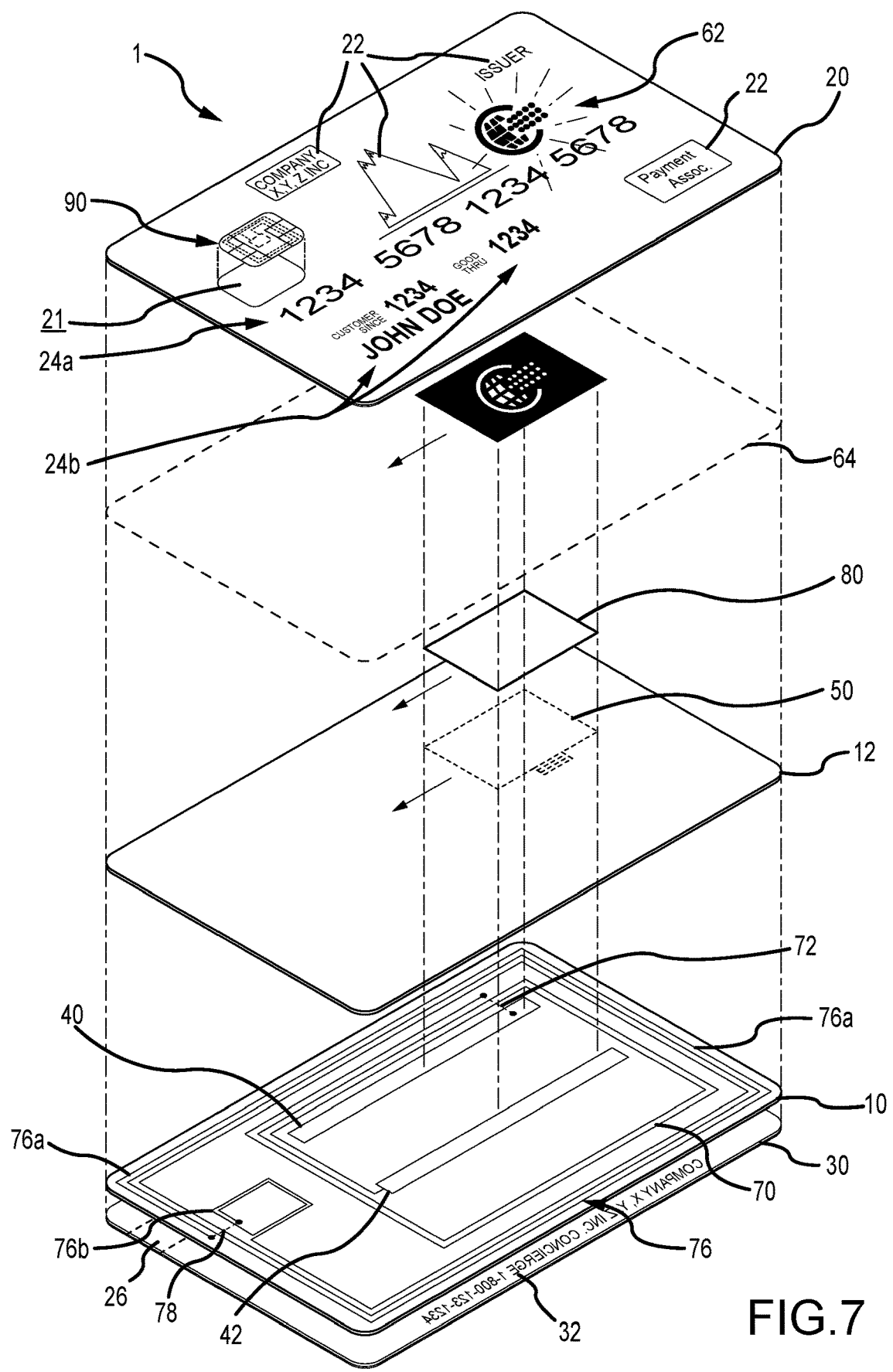
FIG. 7 is an exploded assembly view of another embodiment of an illuminable card.

FIG. 7 illustrates another embodiment of an illuminable card 100 that may include features in common to the features of illuminable card 1 shown and described above in relation to FIGS. 1-6, with certain modifications thereto. As such, in relation to the common features, the same reference numerals are utilized in FIG. 7 and the feature descriptions provided above commonly apply, except as otherwise described or shown in specific relation to FIG. 7.

As shown in FIG. 7, illuminable card 100 includes a card body comprising interconnected, electrically non-conductive first and second carrier layers 10, 12 (e.g. each comprising a polymer-based material), and first core layer 20 overlying and interconnected to the second carrier layer 12. First and second contact pads 40, 42, or rails, and optionally first antenna 70 and/or second antenna 76, may be disposed on and supportably interconnected to a common, upward-facing side of the first carrier layer 10. Illuminable patch 50 may be disposed on and supportably interconnected to a downward-facing side of the second carrier layer 12, facing the upward-facing side of the first carrier layer 10, for electrical coupling with the first and second contact rails 40, 42 (e.g. via direct or capacitive coupling), wherein the illuminable patch illuminates upon receipt of a power signal at the first and second contact pads 40, 42. Such illumination may be provided through the first core layer 20 on a first side of the illuminable card 100 and/or at a peripheral edge of the illuminable card 100.

In one approach, a metallic bridge 72 (shown in phantom) may be disposed on and supportably interconnected to a downward-facing, first side of the first carrier layer 10, with metallic cross-connections at opposing ends through the first carrier layer 10 to the first antenna 70 and first contact rail 40 disposed on an upward-facing, second side of the first carrier layer 10. Further, another metallic bridge (shown in phantom) may be disposed on and supportably interconnected to a downward-facing, first side of the first carrier layer 10, metallic cross-connections at opposing ends through the first carrier layer 10 to offset locations (e.g. opposing ends) of the second antenna 76 disposed on an upward-facing, second side of the first carrier layer 10. In another approach, first antenna 70, and optionally second antenna 76, may be supportably disposed on the downward-facing, first side of the first carrier layer 10, with a metallic bridge extending through the first carrier layer 10 for cross-connection at opposing ends to the first antenna 70 and first contact rail 40, and with another metallic bridge extending through the first carrier layer 10 for cross-connection at opposing ends to offset locations (e.g. opposing ends) of the second antenna 76.

As shown in FIG. 7, the first and second contact rails 40, 42 and the illuminable patch 50 may be provided to facilitate positioning of the illuminable patch 50 at any one of a plurality of different positions on second carrier layer 12 relative to the first and second contact rails 40, 42 on first carrier layer 10 during manufacture, wherein the illuminable patch is functional for illumination at any one of the positions. In that regard, opposing edge portions of the first and second contact rails 40, 42 may have corresponding lengths in a first dimension that are greater than a maximum cross-dimension of illuminable patch 50 in the first dimension to accommodate such variable positioning, and in some embodiments greater than the lengths of adjacent, corresponding edge portions of the illuminable patch 50 in the first dimension, as shown in FIG. 7. In other embodiments, illuminable card 100 may be modified to provide a plurality of sets of first and second contact pads that are disposed on and supportably interconnected to second carrier layer 12, e.g. as shown and described in relation to FIG. 6, to facilitate positioning of illuminable patch 50 at any of a corresponding plurality of locations, thereby facilitating customized placement for a given customer.

The second carrier layer 12 may be one of transparent and translucent. When second carrier layer 12 is translucent, at least a portion of light emitted by the illuminable patch 50 may be internally reflected within the second carrier layer 12 and directed to a peripheral edge of the illuminable card 100 for illumination thereof. Optionally, the second carrier layer 12 may comprise a fluorescent pigment, or dye. When second carrier layer 12 is transparent or translucent, at least a portion of light emitted by the illuminable patch 50 may pass through the second side of the second carrier layer 12 for illumination of at least a portion of a first side of the illuminable card 100. In the later regard, mask 60 may be provided to overlay at least a portion of the illuminable patch 50 to define a predetermined image 62 on the first side of the illuminable card 100 upon illumination of the illuminable patch 50. The mask 60 may be defined as part of an optional print layer 64 that may be provided on an inward-facing side of the first core layer 20. For example, the print layer 64 may comprise an opaque or substantially opaque ink layer (e.g. an ink of any desired color) that is printed across at least a predetermined portion of an inward-facing side of the first core layer 20 so as to extend about and thereby define the predetermined pattern of the mask 60, thereby allowing for light passage through the predetermined pattern. In that regard, the print layer 64 may be provided to comply with visual opacity requirements of ISO/IEC Standard 7810. In one approach, the print layer may extend across the entirety of an inward-facing side or outward-facing side of the first core layer 20, with exception of the predetermined pattern of the mask 60. In another approach, the mask 60 may be supportably interconnected to the carrier layer 10 in overlying relation to the illuminable patch 50.

Phosphorescent patch 80 may be disposed on and supportably interconnected to the second carrier layer 12 in overlying relation to at least a portion of illuminable patch 50, e.g. between at least portions of illuminable patch 50 and mask 60. The phosphorescent patch 80 may have substantially the same configuration as the illuminable patch 50. Phosphorescent patch 80 may be disposed on and supportably interconnected to the upward-facing side of second carrier layer 12, as shown in FIG. 7. Alternatively, phosphorescent patch 80 may be disposed on and supportably interconnected to the downward-facing side of second carrier layer 12, between the downward-facing side of second carrier layer 12 and at least a portion of illuminable patch 50 (e.g. at least a portion of illuminable patch 50 may be disposed on and supportably interconnected to a downward-facing side of the phosphorescent patch 80).

As an additional optional feature, illuminable card 100 may include a film layer(s) (not shown), interconnected to the downward-facing side of first carrier layer 10 and/or the upward-facing side of second carrier layer 12 in overlapping relation to the first and second contact rails 40, 42, illuminable patch 50, first antenna 70, second antenna 80 and/or phosphorescent patch 80 (if included), so as define a pre-laminated inlay. For example, a separate film layer may be adhesively attached to and cover the entirety of the downward-facing side of first carrier layer 10 and upward-facing side of second carrier layer 12, thereby yielding a pre-connected assembly. The film layer(s) may be transparent to allow for the passage of light emitted by illuminable patch 50 therethrough. Additionally, printing may be provided on the film layer(s). For example, a printed mask 60 may be provided in overlapping relation to illuminable patch 50 (e.g. printed as part of a print layer in a manner analogous to print layer 64 described herein). The film layer(s) may comprise polymer-based materials.

In contemplated embodiments, the card body of illuminable card 100 may further include one or a plurality of additional layers disposed on a downward-facing side of the carrier layer 10 (e.g. on an opposing side to the first core layer 20). For example, and as shown in FIG. 1, an optional second core layer 30 may be interconnected to a downward-facing side of the carrier layer 10. As described above in relation to illuminable card 1, printing 22, 32 may be provided on either or both sides of the first core layer 20 and second core layer 30, respectively, wherein such printing is visible from a first side and/or second side of the illuminable card 100. In turn, a protective, transparent outer film layer(s) may be provided on an outward-facing side of each of the first core layer 20 and second core layer 30 (if provided).

The first core layer 20 (e.g. about 0.006 to 0.001 inch thick), second core layer 30 (e.g. about 0.006 to 0.001 inch thick), and protective, outer film layers may comprise polymer-based materials (e.g. polyvinyl chloride, polyethylene terephthalate, polyethylene terephthalate glycol-modified, polyester, and/or polycarbonate). Further, the first carrier layer 10 and second carrier layer 12 (e.g. about 0.006 to 0.012 inch combined thickness) may comprise a polymer-based material (e.g. polyethylene terephthalate and/or polycarbonate). Additionally, the various layers described herein may be interconnected via lamination, with thermo-adhesive polymer-based layers or thermosetting, polymer-based layers disposed between adjacent one of the layers.

The illuminable card 100 may be provided in a variety of forms. For example, the illuminable card 100 may be provided as a collector card, an identity card, an access card, a loyalty card, a membership card, a transit card, or a transaction card. In the later regard, illuminable card 100 may be provided with additional features for use as a transaction card, as described in relation to illuminable card 1 shown in FIGS. 1, 2A and 2B.

Figure 8:
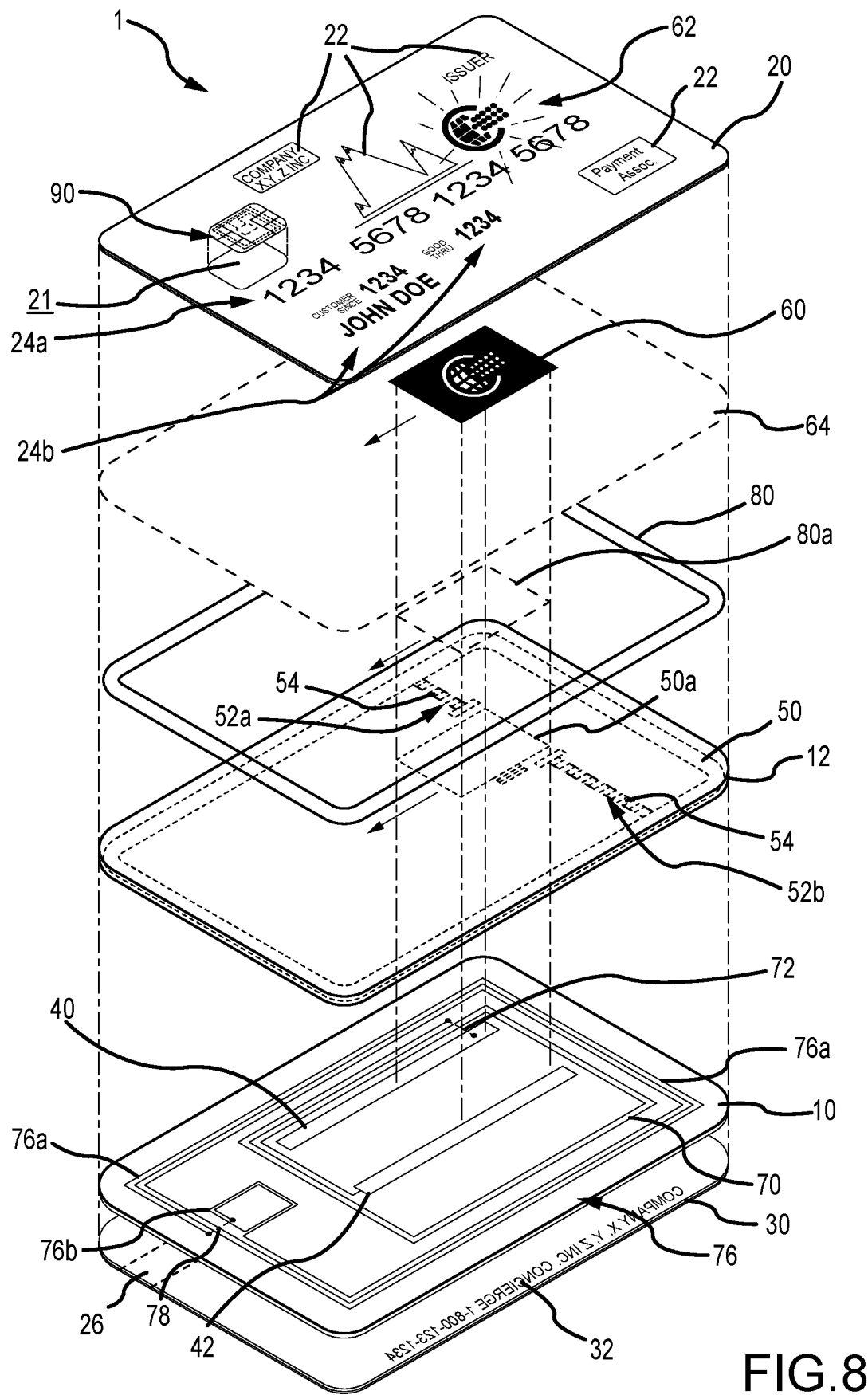
FIG. 8 is an exploded assembly view of another embodiment of an illuminable card.

FIG. 8 illustrates the illuminable card 100 of FIG. 7, with modified configurations of illuminable patch 50 on second carrier layer 12 and phosphorescent patch 80. The illuminable card 100 shown in FIG. 8 may include features in common to the features of illuminable card 1 and illuminable card 100, shown and described above in relation to FIGS. 1-6 and FIG. 7, respectively, with certain modifications thereto. As such, in relation to the common features, the same reference numerals are utilized in FIG. 8 and the feature descriptions provided above commonly apply, except as otherwise described or shown in specific relation to FIG. 8.

As shown in FIG. 8, illuminable patch 50 may be of an elongate configuration that extends along (e.g. in parallel relation to) at least a portion or an entirety of a peripheral edge of illuminable card 100, wherein the illuminable patch 50 is disposed for electrical coupling with first and second contact pads 40, 42, for illumination upon the provision of a power signal to first and second contact pads 40, 42. In turn, the second carrier layer 12 may be translucent to yield enhanced edge illumination about at least one side edge, a plurality of side edges, or an entire peripheral edge of illuminable card 100. More particularly, and as shown, illuminable patch 50 may be of a frame-like, rectangular configuration that defines an open field therewithin on the second carrier layer 12. In other embodiments, illuminable patch 50 may extend along a single edge, two opposing, electrically interconnected edges in a width dimension or length dimension, or three, electrically interconnected, contiguous edges of illuminable card 100, As further illustrated in FIG. 8, the first antenna 70 may be located on first carrier layer 10 so as to extend within and in non-overlapping relation to the frame-like, illuminable patch 50 (e.g. within the open field defined by the frame-like, illuminable patch 50). In turn, first and second electrical contacts 52a, 52b may be disposed and supportably interconnected to the downward-facing, first side of the second carrier layer 12, in electrical contact with and between different, offset portions of the illuminable patch 50 and different ones of the first and second contact pads 40, 42. In such arrangements, an electrically non-conductive material 54 may be provided between the first and second electrical contacts 52, 52b and the first antenna 70 in over-lapped regions thereof.

An optional phosphorescent patch 80 may be supportably disposed on the carrier layer 10 in overlying, corresponding relation to any of the positions at which the illuminable patch 50 may be located during manufacture, between the underlying illuminable patch 50 and the overlying mask 60. In such embodiments the phosphorescent patch 80 may have substantially the same configuration as the illuminable patch 50. For example, and as shown in FIG. 8, phosphorescent patch may be of a frame-like configuration that coincides with the fame-like configuration of illuminable patch 50.

In one approach, phosphorescent patch 80 may be defined by a coating comprising a phosphorescent material that is supportably interconnected to the carrier layer 10 in overlying relation to the illuminable patch 50. For example, and as shown in FIG. 1, a phosphorescent patch 80 may be supportably disposed on the upward-facing, second side of carrier layer 10, in overlapping relation to the illuminable patch 50 disposed on the downward-facing, first side of carrier layer 10. The phosphorescent patch 80 may be provided to effectively convert a visible blue tone illumination of diodes comprising illuminable patch 50 to a visible white tone illumination, thereby further enhancing the aesthetic and/or functional features of the illuminable card 1.

Optionally, in addition to frame-like, illuminable patch 50, another illuminable patch 50a may be provided on the second carrier layer 12 and located between first and second contact rails 40, 42, and another phosphorescent patch 80a may be provided in overlapping relation to illuminable patch 50a, in a manner analogous to that described above in relation to the illuminable patch 50 shown in FIG. 7. In such arrangements, the combined electrical load presented by illuminable patch 50 and illuminable patch 50a may be established to be substantially equal with the illuminable patches 50 other ones of the embodiments, for the design/operational purposes otherwise described herein.

Figure 9:
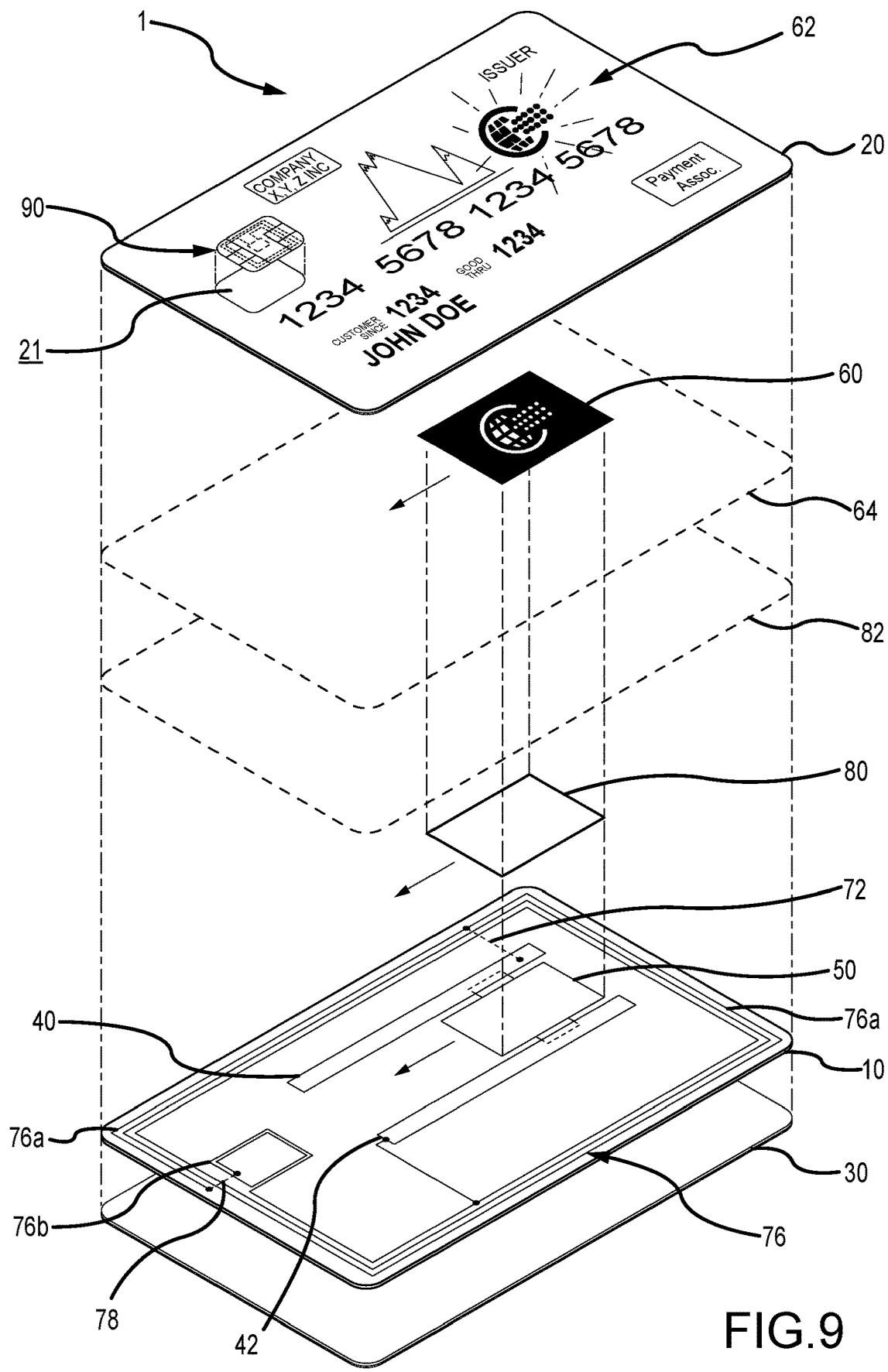
FIG. 9 is an exploded assembly view of another embodiment of an illuminable card.

FIG. 9 illustrates another embodiment of an illuminable card 100 that may include features in common to the features of illuminable card 1 shown and described above in relation to FIGS. 1-6, with certain modifications thereto. As such, in relation to the common features, the same reference numerals are utilized in FIG. 9 and the feature descriptions provided above commonly apply, except as otherwise described or shown in specific relation to FIG. 9.

As shown in FIG. 9, illuminable card 100 includes a card body comprising an electrically non-conductive carrier layer 10 and first core layer 20 overlying and interconnected to the carrier layer 10, with first and second contact pads 40, 42, or rails, disposed on and supportably interconnected to a common side (e.g. downward-facing) of the first carrier layer 10. Further, illuminable patch 50 may be disposed on and supportably interconnected to the same side (e.g. downward-facing) of the carrier layer 10 for electrical coupling with the first and second contact rails 40, 42 (e.g. via direct or capacitive coupling), wherein the illuminable patch illuminates upon receipt of a power signal at the first and second contact pads 40, 42. In the later regard, a single antenna 76 may be disposed on and supportably interconnected to the carrier layer 10 and electrically interconnected at offset locations thereof of to the first and second contact pads 40, 42 to provide the power signal thereto, and electrically interconnected to IC chip module 90 to provide power/data signals.

As shown in FIG. 9, integrated circuit (IC) chip module 90 (e.g. including at least an IC chip) and the antenna 76 may be included for contactless signal transmissions to/from a contactless chip card reader, e.g. radio-frequency radiation signals that provide a power/data signal to the IC chip module 90 via antenna 76 and that provide a power signal at first and second contact rails 40, 42 via antenna 76. As may be appreciated, such contactless signals may provide for data transmissions between the contactless chip card reader and the IC chip module 90 (e.g. data transmissions attendant to the completion of a payment transaction utilizing the illuminable card 1). In that regard, the IC chip module 90 and antenna 76 may be provided for operation in compliance with ISO/IEC Standard 14443.

In the embodiment shown in FIG. 9, the antenna 76 may comprise a continuous length of metal supportably interconnected to the carrier layer 10 and defining one or more outer loop(s) 76a. In one approach, the outer loops(s) 76a may be disposed to extend about the first and second contact rails 40, 42, and illuminable patch 50 on a common side of the carrier layer 10.

In some arrangements, the antenna 76 may be defined by metallic layer(s) supportably disposed on carrier layer 10 (e.g. via plating and etching operations). In other arrangements, the antenna 76 may be defined by metallic wire supportably disposed on and partially embedded in the carrier layer 10.

Various approaches may be utilized to provide for electrical coupling between antenna 76 and the IC chip module 90. For example, in some approaches the IC chip module 90 may be embedded within the illuminable card 100 and directly interconnected to the antenna 76 (e.g. two opposing ends of the outer loop(s) 76a may be electrically interconnected to different ones of a plurality of contacts provided on an IC chip of the IC chip module 90).

In the approach shown in FIG. 9 the illuminable card 100 may include a pocket 26 that extends in to a first side of the illuminable card 100 and that is adapted to receive the IC chip module 90 for electrical coupling with the antenna 76. In some implementations, the IC chip module 90 may include an electrically non-conductive substrate, an IC chip supportably interconnected to an inward-facing side of the substrate, and a plurality of contact pads supportably interconnected to an outward-facing side of the substrate and electrically interconnect through the substrate to different ones of a plurality of contacts of the IC chip. In the later regard, the plurality of contact pads may be provided for contact signal transmissions to/from a contact chip card reader, e.g. electrical signals that provide power to the IC chip module 90 and that provide for data transmission between the contact chip card reader and the IC chip module 90 (e.g. data transmissions attendant to the completion of a payment transaction utilizing the illuminable card 1). In that regard, the IC chip module 90 and plurality of contact pads may be provided for operation in compliance with ISO/IEC Standard 7816. As may be appreciated, in such implementations the illuminable card 100 may be utilized as a dual interface transaction card.

In some arrangements, the IC chip module 90 may further include a coupling antenna supportably interconnected to an inward-facing side of the substrate and electrically interconnected to the IC chip of the IC chip module 90. For example, coupling antenna may comprise a continuous length of metal defining one or more loop(s) extending about the IC chip and electrically interconnected to different ones of a plurality of contacts of the IC chip. In turn, the antenna 76 may be provided for inductive coupling with the coupling antenna of the IC chip module 90. More particularly, and as shown in FIG. 9, antenna 76 may include one or more inner loop(s) 76b, wherein the outer loop(s) 76a and inner loop(s) 76b are defined by the continuous length of metal. The inner loop(s) 76b may be disposed so that, when the IC chip module 90 is secured in the pocket 26, the inner loop(s) 76b and the coupling antenna of the IC chip module 90 are positioned in opposing, spaced relation for inductive coupling. As shown in FIG. 9, a metallic bridge 78 (shown in phantom) may be supportably interconnected to a second side of carrier layer 10, wherein metallic cross-connections may be provided through carrier layer 10 to electrically interconnect an end of outer loop(s) 76a and an end of inner loop(s) 76b.

In the embodiments described above, illuminable patch 50 may comprise a substantially clear, electrically-conductive layer supportably disposed on carrier layer 10, or another carrier layer 12 if provided, for electrical coupling with a first contact pad 40 (e.g. direct or capacitive coupling), or rail, provided on a carrier layer 10, an intermediate layer comprising a plurality of illuminable diodes supportably disposed on the electrically-conductive layer, and an electrically-conductive pad supportably disposed on the intermediate layer for electrical coupling with a second contact pad 42 (e.g. direct or capacitive coupling), or rail, provided on the carrier layer 10. In the later regard, the electrically-conductive pad may be electrically isolated from the electrically-conductive layer by a layer of electrically non-conductive material disposed therebetween.

Various embodiments may comprise any number of combinations of apparatus and/or method features described above and/or hereinbelow. Such combinations may include those encompassed by the following Embodiments:

1. An illuminable card, comprising:
   a card body, including:
   an electrically non-conductive carrier layer; and,
   a first core layer overlying and interconnected to a first side of the carrier layer, wherein the first core layer is at least partially light transmissive;
   electrically-conductive first and second contact pads, supportably interconnected to the carrier layer in opposing, spaced relation to one another, for receiving a power signal from one of an external power supply and an on-board power supply;
   an illuminable patch, supportably interconnected to the carrier layer between the first and second contact rails to illuminate upon receipt of a power signal at the first and second contact rails; and,
   a mask overlying at least a portion of the illuminable patch and defining a predetermined image visible on a first side of the illuminable card upon illumination of the illuminable patch.

2. An illuminable card as recited in Embodiment 1, wherein the first and second contact pads are defined by first and second contact rails, respectively, and wherein opposing edge portions of said first and second contact rails have corresponding lengths in a first dimension that are each greater than a maximum cross-dimension of the illuminable patch in said first dimension.

3. An illuminable card as recited in Embodiment 1 or Embodiment 2, wherein said opposing edge portions of said first and second contact rails extend coincidentally along said corresponding lengths thereof.

4. An illuminable card as recited in any one of Embodiments 1-3, wherein said opposing edge portions of the first and second contact rails extend in substantially parallel relation along the corresponding lengths thereof.

5. An illuminable card as recited in any one of Embodiments 1-4, wherein said card body is rectangular, and wherein the opposing edge portions of the first and second contact rails extend in parallel relation to a peripheral edge of the card body.

6. An illuminable card as recited in any one of Embodiments 1-5, wherein the first and second contact rails each have a corresponding substantially constant width along the corresponding lengths thereof.

7. An illuminable card as recited in any one of Embodiments 1-6, wherein a first part of said edge portion of said first contact rail is overlapped by a corresponding edge portion of the illuminable patch and a second part of said first contact rail extends beyond the corresponding edge portion of the illuminable patch in said first dimension.

8. An illuminable card as recited in any one of Embodiments 1-7, wherein said second part has a corresponding length in said first dimension that is at least 50% of a length of the first part in said first dimension.

9. An illuminable card as recited in any one of Embodiments 1-8, wherein the illuminable patch defines one configuration of the following configurations:
   a polygonal configuration; and,
   an ellipsoid configuration.

10. An illuminable card as recited in any one of Embodiments 1-9, wherein the mask comprises a printed mask printed on one of:
   a surface supportably interconnected to the carrier layer; and,
   a surface of the first core layer.

11. An illuminable card as recited in any one of Embodiments 1-10, wherein said printed mask comprises:
   a substantially opaque ink.

12. An illuminable card as recited in any one of Embodiments 1-11, wherein said mask comprises:
   a printed mask printed on one of an inward-facing surface and an outward-facing surface of the first core layer, and defines at least a first portion of a printed layer.

13. An illuminable card as recited in any one of Embodiments 1-12, wherein a second portion of the printed layer further comprises at least one of:

visible human-readable characters;
visible graphics;
a visible machine-readable marking; and,
a flood layer extending across substantially all of said one of an inward-facing surface and an outward-facing surface of the first core layer.

14. An illuminable card as recited in any one of Embodiments 1-13, further comprising:
a translucent layer disposed in overlapping relation to the illuminable patch, between the illuminable patch and the first core layer, wherein at least one peripheral edge of the card body is illuminated by the translucent layer upon illumination of the illuminable patch.

15. An illuminable card as recited in any one of Embodiments 1-14, wherein said card body further comprises at least one or both of:
a second core layer interconnected to said carrier layer on a downward-facing side thereof; and,
a second core layer interconnected to said carrier layer on a downward-facing side thereof with a metal foil layer interconnected therebetween.

16. An illuminable card as recited in any one of Embodiments 1-15, further comprising at least one of:
an antenna, electrically interconnected at offset positions thereof to different ones of said first and second contact pads, for receiving a contactless power signal from an external source of radio-frequency electromagnetic radiation; and,
an integrated circuit chip electrically interconnected to a plurality of contact pads disposed for receiving a contact power signal from an external contact chip card reader, wherein said first and second contact pads are electrically interconnected to different contact terminals of the integrated circuit chip for receiving said contact power signal.

17. An illuminable card as recited in any one of Embodiments 1-16, further comprising:
an integrated circuit chip disposed in a pocket located on said first side of the illuminable card; and,
an antenna, electrically interconnected at offset positions thereof to different ones of said first and second contact pads and directly coupled to or inductably couplable to the integrated circuit chip, for receiving a contactless power signal from an external source of radio-frequency electromagnetic radiation.

18. An illuminable card as recited in any one of Embodiments 1-17, further comprising:
a first antenna, supportably interconnected to said carrier layer and electrically interconnected at offset positions thereof to different ones of said first and second contact pads, for receiving a contactless power signal from an external source of radio-frequency electromagnetic radiation.

19. An illuminable card as recited in any one of Embodiments 1-18, further comprising:
an integrated circuit chip disposed in a pocket located on said first side of the illuminable card; and,
a second antenna supportably interconnected to the carrier layer and directly coupled to or inductably couplable to the integrated circuit chip, for receiving a contactless power signal from an external contactless chip card reader that includes said external source of radio-frequency electromagnetic radiation.

20. An illuminable card as recited in any one of Embodiments 1-19, wherein said first antenna comprises a first plurality of metallic loops and said second antenna comprises a second plurality of antenna loops, wherein said second plurality of metallic loops extend about said first plurality of metallic loops on said carrier layer.

21. An illuminable card as recited in any one of Embodiments 1-20, wherein said first and second plurality of metallic loops extend about said first and second contact pads and said illuminable patch on said carrier layer.

22. An illuminable card as recited in any one of Embodiments 1-21, further comprising:
a phosphorescent patch overlying at least a portion of the illuminable patch, between said overlying patch and said mask.

23. An illuminable card as recited in any one of Embodiments 1-22, wherein said phosphorescent patch is supportably interconnected in direct contact to one of an upward-facing side and a downward-facing side of the carrier layer.

24. An illuminable card as recited in any one of Embodiments 1-23, wherein said illuminable patch and said first and second contact pads are supportably interconnected to a downward-facing side of the carrier layer and said carrier layer is at least partially light transmissive, and further comprising:
an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

25. An illuminable card as recited in any one of Embodiments 1-24, wherein said first and second contact pads are supportably interconnected to an upward-facing side of the carrier layer, and further comprising:
an electrically non-conductive second carrier layer disposed between said carrier layer and the overlying first core layer, wherein the illuminable patch is supportably interconnected to a downward-facing side of the second carrier layer; and,
an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

26. A plurality of illuminable cards, each comprising:
a commonly-configured card body including:
an electrically non-conductive carrier layer; and,
a first core layer overlying and interconnected to the carrier layer,
wherein the first core layer is at least partially light transmissive; and,
commonly-configured, electrically-conductive first and second contact pads, supportably interconnected to said carrier layer in opposing, spaced relation to one another, for receiving a power signal from one of an external power supply and an on-board power supply;
wherein for a first portion of said plurality of illuminable cards each corresponding illuminable card includes:
a commonly-configured first illuminable patch, supportably disposed for electrical coupling with the corresponding first and second contact pads for illumination upon receipt of a power signal at the corresponding first and second contact pads; and,
a commonly-configured first mask overlying at least a portion of the corresponding first illuminable patch and defining a first predetermined image visible on a first side of the illuminable card upon illumination of the corresponding commonly-configured first illuminable patch;

wherein for a second portion of the plurality of illuminable cards, each corresponding illuminable card further comprises:
a commonly-configured second illuminable patch, supportably disposed for electrical coupling with the corresponding first and second contact pads for illumination upon receipt of a power signal at the corresponding first and second contact pads; and,
a commonly configured second mask overlying at least a portion of the corresponding second illuminable patch and defining a second predetermined image visible on a first side of the illuminable card upon illumination of the corresponding commonly-configured second illuminable patch, wherein said commonly-configured first mask and first predetermined image are different from said commonly-configured second mask and said second predetermined image, respectively.

27. A plurality of illuminable cards as recited in Embodiment 26, wherein for each illuminable card of the first portion of the plurality of illuminable cards the corresponding commonly-configured first illuminable patch is disposed in a common first location relative to the corresponding first and second contact pads, wherein for each illuminable card of the second portion of the plurality of illuminable cards the corresponding commonly-configured second illuminable patch is disposed in a common second location relative to the corresponding first and second contact pads, and wherein said first relative location said second relative location are different.

28. A plurality of illuminable cards as recited in Embodiment 26 or Embodiment 27, wherein for each of the plurality of illuminable cards the corresponding first and second contact pads are defined by first and second contact rails, respectively, and wherein opposing edge portions of said corresponding first and second contact rails have corresponding lengths in a first dimension that are each greater than a maximum cross-dimension of the corresponding commonly-configured first illuminable patch in said first dimension or corresponding commonly-configured second illuminable patch in said first dimension.

29. A plurality of illuminable cards as recited in any one of Embodiments 26-28, wherein said commonly-configured first illuminable patch and said commonly configured second illuminable patch are different, and wherein said commonly-configured first illuminable patch and said commonly configured second illuminable patch define substantially common electrical loads.

30. A plurality of illuminable cards as recited in any one of Embodiments 26-29, wherein each of said plurality of cards comprise the features an illuminable card according to any of Embodiments 1-25 or 31-84.

31. An illuminable card, comprising:
a card body, including:
an electrically non-conductive carrier layer; and,
a first core layer overlying and interconnected to the carrier layer;
electrically-conductive first and second contact rails supportably interconnected to said carrier layer in opposing, spaced relation to one another, for receiving a power signal from one of an external power supply and an on-board power supply;
an illuminable patch supportably disposed for electrical coupling with the first and second contact rails to illuminate upon receipt of a power signal at the first and second contact rails, wherein opposing edge portions of said first and second contact rails have corresponding lengths in a first dimension that are each greater than a maximum cross-dimension of the illuminable patch in said first dimension.

32. An illuminable card as recited in Embodiment 31, wherein said opposing edge portions of said first and second contact rails extend coincidentally along said corresponding lengths thereof.

33. An illuminable card as recited in Embodiment 31 or Embodiment 32, wherein said opposing edge portions of the first and second contact rails extend in substantially parallel relation along the corresponding lengths thereof.

34. An illuminable card as recited in any one of Embodiments 31-33, wherein said card body is rectangular, and wherein the opposing edge portions of the first and second contact rails extend in parallel relation to a peripheral edge of the card body.

35. An illuminable card as recited in any one of Embodiments 31-34, wherein the first and second contact rails each have a corresponding substantially constant width along the corresponding lengths thereof.

36. An illuminable card as recited in any one of Embodiments 31-35, wherein a first part of said edge portion of said first contact rail is overlapped by a corresponding edge portion of the illuminable patch and a second part of said first contact rail extends beyond the corresponding edge portion of the illuminable patch in said first dimension.

37. An illuminable card as recited in any one of Embodiments 31-36, wherein said second part has a corresponding length in said first dimension that is at least 50% of a length of the first part in said first dimension.

38. An illuminable card as recited in any one of Embodiments 31-37, wherein the illuminable patch defines one configuration of the following configurations:
a polygonal configuration; and,
an ellipsoid configuration.

39. An illuminable card as recited in any one of Embodiments 31-38, further comprising:
a mask overlying at least a portion of the illuminable patch and defining a predetermined image visible on a first side of the illuminable card upon illumination of the illuminable patch.

40. An illuminable card as recited in any one of Embodiments 31-39, wherein the mask comprises a printed mask printed on one of:
a surface supportably interconnected to the carrier layer; and,
a surface of the first core layer.

41. An illuminable card as recited in any one of Embodiments 31-40 wherein said printed mask comprises:
a substantially opaque ink.

42. An illuminable card as recited in any one of Embodiments 31-41, wherein said mask comprises:
a printed mask printed on one of an inward-facing surface and an outward-facing surface of the first core layer, and defines at least a first portion of a printed layer.

43. An illuminable card as recited in any one of Embodiments 31-42, wherein a second portion of the printed layer further comprises at least one of:
visible human-readable characters;
visible graphics;
a visible machine-readable marking; and,
a flood layer extending across substantially all of said one of an inward-facing surface and an outward-facing surface of the first core layer.

44. An illuminable card as recited in any one of Embodiments 31-43, further comprising:
a translucent layer disposed in overlapping relation to the illuminable patch, between the illuminable patch and the first core layer, wherein at least one peripheral edge of the card body is illuminated by the translucent layer upon illumination of the illuminable patch.

45. An illuminable card as recited in any one of Embodiments 31-44, wherein said card body further comprises at least one or both of:
a second core layer interconnected to said carrier layer on a downward-facing side thereof; and,
a second core layer interconnected to said carrier layer on a downward-facing side thereof with a metal foil layer interconnected therebetween.

46. An illuminable card as recited in any one of Embodiments 31-45, further comprising at least one of:
an antenna, electrically interconnected at offset positions thereof to different ones of said first and second contact pads, for receiving a contactless power signal from an external source of radio-frequency electromagnetic radiation; and, an integrated circuit chip electrically interconnected to a plurality of contact pads disposed for receiving a contact power signal from an external contact chip card reader, wherein said first and second contact pads are electrically interconnected to different contact terminals of the integrated circuit chip for receiving said contact power signal.

47. An illuminable card as recited in any one of Embodiments 31-46, further comprising:
an integrated circuit chip disposed in a pocket located on said first side of the illuminable card; and,
an antenna, electrically interconnected at offset positions thereof to different ones of said first and second contact pads and directly coupled to or inductably couplable to the integrated circuit chip, for receiving a contactless power signal from an external source of radio-frequency electromagnetic radiation.

48. An illuminable card as recited in any one of Embodiments 31-47, further comprising:
a first antenna, supportably interconnected to said carrier layer and electrically interconnected at offset positions thereof to different ones of said first and second contact pads, for receiving a contactless power signal from an external source of radio-frequency electromagnetic radiation.

49. An illuminable card as recited in any one of Embodiments 31-48, further comprising:
an integrated circuit chip disposed in a pocket located on said first side of the illuminable card; and,
a second antenna supportably interconnected to the carrier layer and directly coupled to or inductably couplable to the integrated circuit chip, for receiving a contactless power signal from an external contactless chip card reader that includes said external source of radio-frequency electromagnetic radiation.

50. An illuminable card as recited in any one of Embodiments 31-49, wherein said first antenna comprises a first plurality of metallic loops and said second antenna comprises a second plurality of antenna loops, wherein said second plurality of metallic loops extend about said first plurality of metallic loops on said carrier layer.

51. An illuminable card as recited in any one of Embodiments 31-50, wherein said second plurality of metallic loops extend about said first and second contact pads and said illuminable patch on said carrier layer.

52. An illuminable card as recited in any one of Embodiments 31-51, further comprising:
a phosphorescent patch overlying at least a portion of the illuminable patch, between said overlying patch and said mask.

53. An illuminable card as recited in any one of Embodiments 31-52, wherein said phosphorescent patch is supportably interconnected in direct contact to one of an upward-facing side and a downward-facing side of the carrier layer.

54. An illuminable card as recited in any one of Embodiments 31-53, wherein said illuminable patch and said first and second contact pads are supportably interconnected to a downward-facing side of the carrier layer and said carrier layer is at least partially light transmissive, and further comprising:
an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

55. An illuminable card as recited in any one of Embodiments 31-54, wherein said first and second contact pads are supportably interconnected to an upward-facing side of the carrier layer, and further comprising:
an electrically non-conductive second carrier layer disposed between said carrier layer and the overlying first core layer, wherein the illuminable patch is supportably interconnected to a downward-facing side of the second carrier layer; and, an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

56. An illuminable card, comprising:
a card body, including:
an electrically non-conductive first carrier layer;
an electrically non-conductive second carrier layer interconnected to the first carrier layer; and,
a first core layer overlying and interconnected to the second carrier layer;
electrically-conductive first and second contact pads supportably interconnected to an upward-facing side of said first carrier layer in opposing, spaced relation to one another, for receiving a power signal from one of an external power supply and an on-board power supply; and,
an illuminable patch supportably interconnected to a downward-facing side of the second carrier layer for electrical coupling with the first and second contact pads to illuminate upon receipt of a power signal at the first and second contact pads.

57. An illuminable card as recited in Embodiment 56, wherein the first and second contact pads are defined by first and second contact rails, respectively, and wherein opposing edge portions of said first and second contact rails have corresponding lengths in a first dimension that are each greater than a maximum cross-dimension of the illuminable patch in said first dimension.

58. An illuminable card as recited in Embodiment 56 or Embodiment 57, wherein said opposing edge portions of said first and second contact rails extend coincidentally along said corresponding lengths thereof.

59. An illuminable card as recited in any one of Embodiments 56-58, wherein said opposing edge portions of the first and second contact rails extend in substantially parallel relation along the corresponding lengths thereof.

60. An illuminable card as recited in any one of Embodiments 56-59, wherein said card body is rectangular, and wherein the opposing edge portions of the first and second contact rails extend in parallel relation to a peripheral edge of the card body.

61. An illuminable card as recited in any one of Embodiments 56-60, wherein the first and second contact rails each have a corresponding substantially constant width along the corresponding lengths thereof.

62. An illuminable card as recited in any one of Embodiments 56-61, wherein a first part of said edge portion of said first contact rail is overlapped by a corresponding edge portion of the illuminable patch and a second part of said first contact rail extends beyond the corresponding edge portion of the illuminable patch in said first dimension.

63. An illuminable card as recited in any one of Embodiments 56-62, wherein said second part has a corresponding length in said first dimension that is at least 50% of a length of the first part in said first dimension.

64. An illuminable card as recited in any one of Embodiments 56-63, wherein the illuminable patch defines one configuration of the following configurations:
 a polygonal configuration; and,
 an ellipsoid configuration.

65. An illuminable card as recited in any one of Embodiments 56-64, wherein the illuminable patch is of an elongate configuration and extends along at least one peripheral edge of the illuminable card.

66. An illuminable card as recited in any one of Embodiments 56-65, wherein the illuminable patch is of an elongate configuration and extends along a plurality of peripheral side edges of the illuminable card.

67. An illuminable card as recited in any one of Embodiments 56-66, wherein the illuminable patch is of a frame-like configuration and extends along an entire peripheral edge of the illuminable card.

68. An illuminable card as recited in any one of Embodiments 56-67, further comprising:
 a mask overlying at least a portion of the illuminable patch and defining a predetermined image visible on a first side of the illuminable card upon illumination of the illuminable patch.

69. An illuminable card as recited in any one of Embodiments 56-68, wherein the mask comprises a printed mask printed on one of:
 a surface supportably interconnected to the second carrier layer; and,
 a surface of the first core layer.

70. An illuminable card as recited in any one of Embodiments 56-69, wherein said printed mask comprises:
 a substantially opaque ink.

71. An illuminable card as recited in any one of Embodiments 56-70, wherein said mask comprises:
 a printed mask printed on one of an inward-facing surface and an outward-facing surface of the first core layer, and defines at least a first portion of a printed layer.

72. An illuminable card as recited in any one of Embodiments 56-71, wherein a second portion of the printed layer further comprises at least one of:
 visible human-readable characters;
 visible graphics;
 a visible machine-readable marking; and,
 a flood layer extending across substantially all of said one of an inward-facing surface and an outward-facing surface of the first core layer.

73. An illuminable card as recited in any one of Embodiments 56-72, further comprising:
 a translucent layer disposed in overlapping relation to the illuminable patch, between the illuminable patch and the first core layer, wherein at least one peripheral edge of the card body is illuminated by the translucent layer upon illumination of the illuminable patch.

74. An illuminable card as recited in any one of Embodiments 56-73, wherein said card body further comprises at least one or both of:
 a second core layer interconnected to said carrier layer on a downward-facing side thereof; and,
 a second core layer interconnected to said carrier layer on a downward-facing side thereof with a metal foil layer interconnected therebetween.

75. An illuminable card as recited in any one of Embodiments 56-74, further comprising at least one of:
 an antenna, electrically interconnected at offset positions thereof to different ones of said first and second contact pads, for receiving a contactless power signal from an external source of radio-frequency electromagnetic radiation; and,
 an integrated circuit chip electrically interconnected to a plurality of contact pads disposed for receiving a contact power signal from an external contact chip card reader, wherein said first and second contact pads are electrically interconnected to different contact terminals of the integrated circuit chip for receiving said contact power signal.

76. An illuminable card as recited in any one of Embodiments 56-75, further comprising:
 an integrated circuit chip disposed in a pocket located on said first side of the illuminable card; and,
 an antenna, electrically interconnected at offset positions thereof to different ones of said first and second contact pads and directly coupled to or inductably couplable to the integrated circuit chip, for receiving a contactless power signal from an external source of radio-frequency electromagnetic radiation.

77. An illuminable card as recited in any one of Embodiments 56-76, further comprising:
 a first antenna, supportably interconnected to said carrier layer and electrically interconnected at offset positions thereof to different ones of said first and second contact pads, for receiving a contactless power signal from an external source of radio-frequency electromagnetic radiation.

78. An illuminable card as recited in any one of Embodiments 56-77, further comprising:
 an integrated circuit chip disposed in a pocket located on said first side of the illuminable card; and,
 a second antenna supportably interconnected to the carrier layer and directly coupled to or inductably couplable to the integrated circuit chip, for receiving a contactless power signal from an external contactless chip card reader that includes said external source of radio-frequency electromagnetic radiation.

79. An illuminable card as recited in any one of Embodiments 56-78, wherein said first antenna comprises a first plurality of metallic loops and said second antenna comprises a second plurality of antenna loops, wherein said second plurality of metallic loops extend about said first plurality of metallic loops on said carrier layer.

80. An illuminable card as recited in any one of Embodiments 56-79, wherein said second plurality of metallic loops extend about said first and second contact pads and said illuminable patch on said carrier layer.

81. An illuminable card as recited in any one of Embodiments 56-80, further comprising:
 a phosphorescent patch overlying at least a portion of the illuminable patch, between said overlying patch and said mask.

82. An illuminable card as recited in any one of Embodiments 56-81, wherein said phosphorescent patch is supportably interconnected in direct contact to one of an upward-facing side and a downward-facing side of the second carrier layer.

83. An illuminable card as recited in any one of Embodiments 56-82, wherein said illuminable patch and said first and second contact pads are supportably interconnected to a downward-facing side of the carrier layer and said carrier layer is at least partially light transmissive, and further comprising:
an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

84. An illuminable card as recited in any one of Embodiments 56-83, wherein said first and second contact pads are supportably interconnected to an upward-facing side of the carrier layer, and further comprising:
an electrically non-conductive second carrier layer disposed between said carrier layer and the overlying first core layer, wherein the illuminable patch is supportably interconnected to a downward-facing side of the second carrier layer; and, an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. An illuminable card, comprising:
    a card body, including:
        an electrically non-conductive carrier layer; and,
        a first core layer overlying and interconnected to a first side of the carrier layer,
    wherein the first core layer is at least partially light transmissive;
    electrically-conductive first and second contact pads, supportably interconnected to the carrier layer in opposing, spaced relation to one another, for receiving a power signal from at least one of an external power supply and/or an on-board power supply;
    an illuminable patch, supportably interconnected to the carrier layer between first and second contact pads to illuminate upon receipt of a power signal at the first and second contact pads; and,
    a mask overlying at least a portion of the illuminable patch and defining a predetermined image visible on a first side of the illuminable card upon illumination of the illuminable patch.

2. An illuminable card as recited in claim 1, wherein the first and second contact pads are defined by first and second contact rails, respectively, and wherein opposing edge portions of the first and second contact rails have corresponding lengths in a first dimension that are each greater than a maximum cross-dimension of the illuminable patch in the first dimension.

3. An illuminable card as recited in claim 2, wherein the opposing edge portions of the first and second contact rails extend in substantially parallel relation along the corresponding lengths thereof.

4. An illuminable card as recited in claim 2, wherein a first part of the edge portion of the first contact rail is overlapped by a corresponding edge portion of the illuminable patch and a second part of the first contact rail extends beyond the corresponding edge portion of the illuminable patch in the first dimension.

5. An illuminable card as recited in claim 1, wherein the mask comprises a printed mask printed on one of:
    a surface supportably interconnected to the carrier layer; or,
    a surface of the first core layer.

6. An illuminable card as recited in claim 1, wherein the mask comprises:
    a printed mask printed on one of an inward-facing surface or an outward-facing surface of the first core layer, and defines at least a first portion of a printed layer.

7. An illuminable card as recited in claim 6, wherein a second portion of the printed layer further comprises at least one of:
    visible human-readable characters;
    visible graphics;
    a visible machine-readable marking; or,
    a flood layer extending across substantially all of the one of an inward-facing surface and an outward-facing surface of the first core layer.

8. An illuminable card as recited in claim 1, further comprising:
    a translucent layer disposed in overlapping relation to the illuminable patch, between the illuminable patch and the first core layer, wherein at least one peripheral edge of the card body is illuminated by the translucent layer upon illumination of the illuminable patch.

9. An illuminable card as recited in claim 1, wherein the card body further comprises at least one or both of:
    a second core layer interconnected to the carrier layer on a downward-facing side thereof; or,
    a second core layer interconnected to the carrier layer on a downward-facing side thereof with a metal foil layer interconnected therebetween.

10. An illuminable card as recited in claim 1, further comprising at least one of:
    an antenna, electrically interconnected at offset positions thereof to different ones of the first and second contact pads, for receiving a contactless power signal from an external source of radio-frequency electromagnetic radiation; or,
    an integrated circuit chip electrically interconnected to a plurality of contact pads disposed for receiving a contact power signal from an external contact chip card reader, wherein the first and second contact pads are electrically interconnected to different contact terminals of the integrated circuit chip for receiving the contact power signal.

11. An illuminable card as recited in claim 1, further comprising:
    a first antenna, supportably interconnected to the carrier layer and electrically interconnected at offset positions thereof to different ones of the first and second contact pads, for receiving a contactless power signal from an external source of radio-frequency electromagnetic radiation.

12. An illuminable card as recited in claim 11, further comprising:
an integrated circuit chip disposed in a pocket located on the first side of the illuminable card; and,
a second antenna supportably interconnected to the carrier layer and directly coupled to or inductably couplable to the integrated circuit chip, for receiving a contactless power signal from an external contactless chip card reader that includes the external source of radio-frequency electromagnetic radiation.

13. An illuminable card as recited in claim 1, further comprising:
a phosphorescent patch overlying at least a portion of the illuminable patch, between the overlying patch and the mask.

14. An illuminable card as recited in claim 1, wherein the illuminable patch and the first and second contact pads are supportably interconnected to a downward-facing side of the carrier layer and the carrier layer is at least partially light transmissive, and further comprising:
an antenna, supportably interconnected to the downward-facing side of the carrier layer and electrically interconnected at offset positions thereof to different ones of the first and second contact pads, for receiving a contactless power signal from an external source of radio-frequency electromagnetic radiation.

15. An illuminable card as recited in claim 1, wherein the first and second contact pads are supportably interconnected to an upward-facing side of the carrier layer, and further comprising:
an electrically non-conductive second carrier layer disposed between the carrier layer and the overlying first core layer, wherein the illuminable patch is supportably interconnected to a downward-facing side of the second carrier layer; and,
an antenna, supportably interconnected to the downward-facing side of the carrier layer and electrically interconnected at offset positions thereof to different ones of the first and second contact pads, for receiving a contactless power signal from an external source of radio-frequency electromagnetic radiation.

16. An illuminable card as recited in claim 1, wherein a first part of the edge portion of the first contact rail is overlapped by a corresponding edge portion of the illuminable patch and a second part of the first contact rail extends beyond the corresponding edge portion of the illuminable patch in said first dimension.

17. An illuminable card, comprising:
a card body, including:
an electrically non-conductive carrier layer; and,
a first core layer overlying and interconnected to the carrier layer;
electrically-conductive first and second contact rails supportably interconnected to the carrier layer in opposing, spaced relation to one another, for receiving a power signal from one of an external power supply or an on-board power supply;
an illuminable patch supportably disposed for electrical coupling with the first and second contact rails to illuminate upon receipt of a power signal at the first and second contact rails, wherein opposing edge portions of the first and second contact rails have corresponding lengths in a first dimension that are each greater than a maximum cross-dimension of the illuminable patch in said first dimension.

18. An illuminable card as recited in claim 17, further comprising:
a mask overlying at least a portion of the illuminable patch and defining a predetermined image visible on a first side of the illuminable card upon illumination of the illuminable patch.

19. An illuminable card as recited in claim 18, wherein the mask comprises a printed mask printed on one of:
a surface supportably interconnected to the carrier layer; or,
a surface of the first core layer.

20. An illuminable card as recited in claim 18, wherein the mask comprises:
a printed mask printed on one of an inward-facing surface and an outward-facing surface of the first core layer, and defines at least a first portion of a printed layer.

21. An illuminable card as recited in claim 17, further comprising:
a translucent layer disposed in overlapping relation to the illuminable patch, between the illuminable patch and the first core layer, wherein at least one peripheral edge of the card body is illuminated by the translucent layer upon illumination of the illuminable patch.

22. An illuminable card as recited in claim 17, wherein the card body further comprises at least one or both of:
a second core layer interconnected to the carrier layer on a downward-facing side thereof; or,
a second core layer interconnected to said carrier layer on a downward-facing side thereof with a metal foil layer interconnected therebetween.

23. An illuminable card as recited in claim 17, further comprising at least one of:
an antenna, electrically interconnected at offset positions thereof to different ones of the first and second contact pads, for receiving a contactless power signal from an external source of radio-frequency electromagnetic radiation; or,
an integrated circuit chip electrically interconnected to a plurality of contact pads disposed for receiving a contact power signal from an external contact chip card reader, wherein the first and second contact pads are electrically interconnected to different contact terminals of the integrated circuit chip for receiving said contact power signal.

24. An illuminable card as recited in claim 17, further comprising:
a first antenna, supportably interconnected to the carrier layer and electrically interconnected at offset positions thereof to different ones of the first and second contact pads, for receiving a contactless power signal from an external source of radio-frequency electromagnetic radiation;
an integrated circuit chip disposed in a pocket located on the first side of the illuminable card; and,
a second antenna supportably interconnected to the carrier layer and directly coupled to or inductably couplable to the integrated circuit chip, for receiving a contactless power signal from an external contactless chip card reader that includes the external source of radio-frequency electromagnetic radiation.

25. An illuminable card as recited in claim 24, wherein the first antenna comprises a first plurality of metallic loops and the second antenna comprises a second plurality of antenna loops, wherein the second plurality of metallic loops extend about the first plurality of metallic loops on the carrier layer; and the second plurality of metallic loops extending about the first and second contact pads and the illuminable patch on the carrier layer.

26. An illuminable card as recited in claim 17, further comprising:

a phosphorescent patch overlying at least a portion of the illuminable patch, between the overlying patch and the mask.

27. An illuminable card as recited in claim 17, wherein the illuminable patch and the first and second contact pads are supportably interconnected to a downward-facing side of the carrier layer and the carrier layer is at least partially light transmissive, and further comprising:

an antenna, supportably interconnected to the downward-facing side of the carrier layer and electrically interconnected at offset positions thereof to different ones of said first and second contact pads, for receiving a contactless power signal from an external source of radio-frequency electromagnetic radiation.

28. An illuminable card as recited in claim 17, wherein the first and second contact pads are supportably interconnected to an upward-facing side of the carrier layer, and further comprising:

an electrically non-conductive second carrier layer disposed between the carrier layer and the overlying first core layer, wherein the illuminable patch is supportably interconnected to a downward-facing side of the second carrier layer; and, an antenna, supportably interconnected to the downward-facing side of the carrier layer and electrically interconnected at offset positions thereof to different ones of the first and second contact pads, for receiving a contactless power signal from an external source of radio-frequency electromagnetic radiation.

29. An illuminable card, comprising:

a card body, including:

an electrically non-conductive first carrier layer;

an electrically non-conductive second carrier layer interconnected to the first carrier layer; and, a first core layer overlying and interconnected to the second carrier layer;

electrically-conductive first and second contact pads supportably interconnected to an upward-facing side of the first carrier layer in opposing, spaced relation to one another, for receiving a power signal from one of an external power supply or an on-board power supply; and, an illuminable patch supportably interconnected to a downward-facing side of the second carrier layer for electrical coupling with the first and second contact pads to illuminate upon receipt of a power signal at the first and second contact pads.

30. An illuminable card as recited in claim 29, further comprising:

a mask overlying at least a portion of the illuminable patch and defining a predetermined image visible on a first side of the illuminable card upon illumination of the illuminable patch.

* * * * *